United States Patent
Ariyoshi et al.

(10) Patent No.: US 11,093,730 B2
(45) Date of Patent: Aug. 17, 2021

(54) MEASUREMENT SYSTEM AND MEASUREMENT METHOD

(71) Applicant: OMRON Corporation, Kyoto (JP)

(72) Inventors: Tomonori Ariyoshi, Kusatsu (JP); Toyoo Iida, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 48 days.

(21) Appl. No.: 16/413,608

(22) Filed: May 16, 2019

(65) Prior Publication Data
US 2019/0377931 A1 Dec. 12, 2019

(30) Foreign Application Priority Data
Jun. 11, 2018 (JP) .............................. JP2018-111124

(51) Int. Cl.
*G06K 9/00* (2006.01)
*G06T 7/55* (2017.01)
*G06K 9/52* (2006.01)
*G06T 7/33* (2017.01)

(52) U.S. Cl.
CPC ........... *G06K 9/00214* (2013.01); *G06K 9/52* (2013.01); *G06T 7/55* (2017.01); *G06T 7/33* (2017.01)

(58) Field of Classification Search
CPC ........................................ G06T 2207/30164
See application file for complete search history.

(56) References Cited

U.S. PATENT DOCUMENTS

| 2010/0231711 A1* | 9/2010 | Taneno | G06K 9/00214 348/135 |
|---|---|---|---|
| 2016/0283792 A1* | 9/2016 | Okazaki | B25J 9/1612 |
| 2017/0106540 A1* | 4/2017 | Watanabe | B25J 9/1697 |
| 2018/0250820 A1* | 9/2018 | Shimodaira | B25J 9/1697 |
| 2020/0230821 A1* | 7/2020 | Watanabe | G06T 19/20 |

FOREIGN PATENT DOCUMENTS

JP          2010218016          9/2010

* cited by examiner

*Primary Examiner* — Oneal R Mistry
(74) *Attorney, Agent, or Firm* — JCIPRNET

(57) ABSTRACT

A configuration capable of realizing object authentication with higher accuracy is desired. A measurement system includes a shape measurement unit that performs measurement, a storage unit that stores an entire model for each work piece type, and a recognition processing unit that executes object authentication based on whether or not a three-dimensional shape measured by the shape measurement unit is consistent with any one entire model stored in the storage unit. The entire model for each work piece type is specified by a combination of a plurality of partial models and each of the plurality of partial models is correspondingly given a degree of importance. The recognition processing unit determines whether or not the three-dimensional shape is consistent with any one entire model based on degrees of importance corresponding to one or more partial models included in the entire model.

14 Claims, 15 Drawing Sheets

| 442 | 444 | 446 | 448 |
|---|---|---|---|
| CAMERA MODEL | VISUAL FIELD SPECIFICATION | MINIMUM MEASUREMENT WIDTH (VISUAL FIELD 1%) | WEIGHTING COEFFICIENT (POINT GROUP RATIO) |
| NARROW VISUAL FIELD TYPE | □300 × 300mm | 3mm | 0.0～1.0 |
| MEDIUM VISUAL FIELD TYPE | □600 × 600mm | 6mm | 0.0～1.0 |
| WIDE VISUAL FIELD TYPE | □1000 × 1000mm | 10mm | 0.0～1.0 |

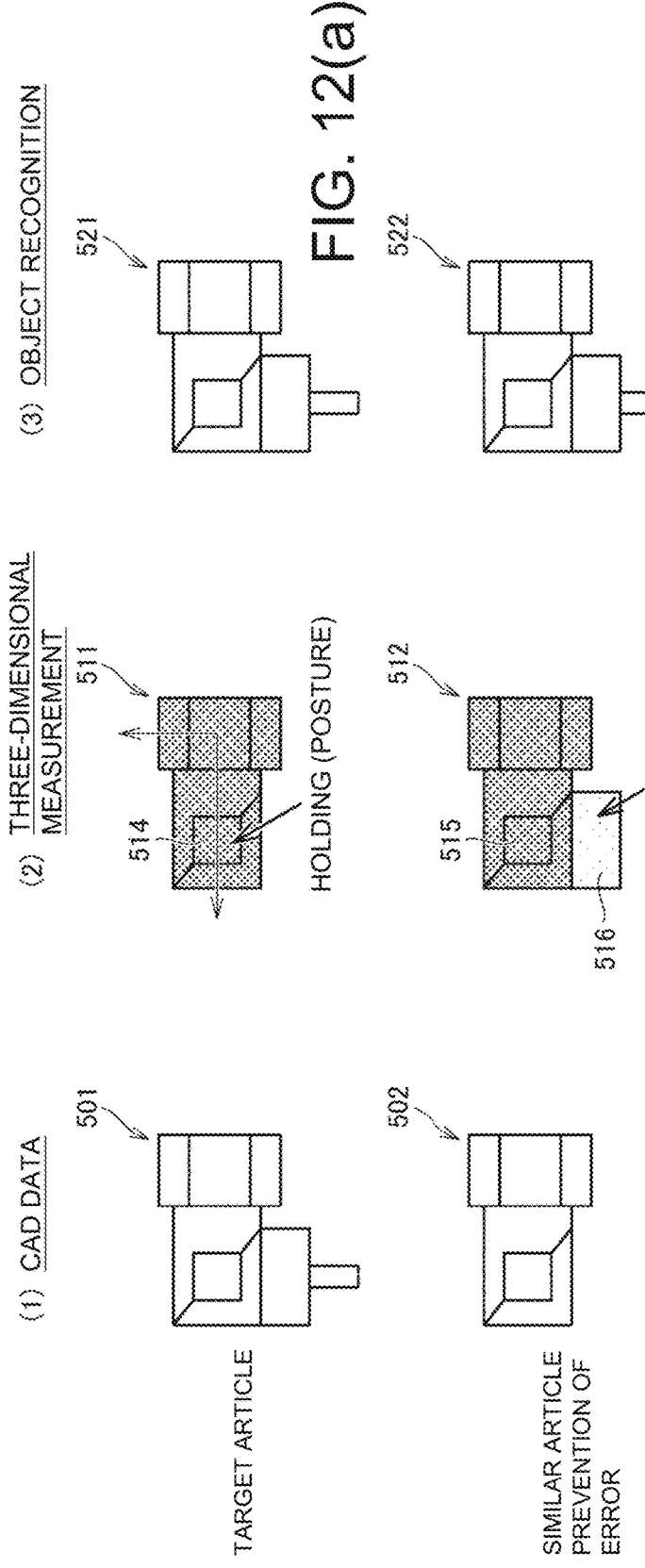

MEASUREMENT SYSTEM AND MEASUREMENT METHOD

CROSS REFERENCE TO RELATED APPLICATIONS

This application claims the priority benefit of Japanese Patent Application No. 2018-111124, filed on Jun. 11, 2018. The entirety of the above-mentioned patent application is hereby incorporated by reference herein and made a part of this specification.

BACKGROUND

Technical Field

The present technology relates to a measurement system that optically measures a three-dimensional shape of a work piece disposed at a predetermined position, and a measurement method.

Description of Related Art

A technique for optically measuring a three-dimensional shape of a work piece disposed at a predetermined position has become known. A process of collating the measured three-dimensional shape with model data registered in advance to determine whether or not a work piece of a designated type is present or to which type the present work piece belongs is executed.

For example, Patent Document 1 (Japanese Patent Laid-Open No. 2010-218016) discloses a configuration for easily creating model data which is suitable for installation environments and measurement conditions of individual visual sensors and has a secured accuracy of recognition.

According to the method disclosed in Patent Document 1, model data to be registered is generated by deleting unnecessary information from a basic model. That is, according to the method disclosed in Patent Document 1, only a portion to be collated, among portions included in the basic model, is registered as model data.

In comparison with the case that such a model data is used, a configuration capable of realizing object authentication with higher accuracy is provided.

SUMMARY

According to one aspect of the disclosure, a measurement system is provided to include a shape measurement unit which optically measures a three-dimensional shape of a work piece disposed at a predetermined position, a storage unit which previously stores a three-dimensional shape indicating an entire model for each work piece type, and a recognition processing unit which executes at least one of a detection of presence of a work piece and a specification of a work piece type based on whether or not the three-dimensional shape measured by the shape measurement unit is consistent with any one entire model stored in the storage unit. The entire model for each work piece type is specified by a combination of a plurality of partial models and each of the plurality of partial models is correspondingly given a degree of importance. The recognition processing unit determines whether or not the three-dimensional shape is consistent with any one entire model based on degrees of importance corresponding to one or more partial models included in the entire model.

According to another aspect of the disclosure, a measurement method is provided to include a step of optically measuring a three-dimensional shape of a work piece disposed at a predetermined position, and a step of executing at least one of a detection of presence of a work piece and a specification of a work piece type based on whether or not the measured three-dimensional shape is consistent with any one entire model stored in advance. A three-dimensional shape indicating an entire model is stored in advance for each work piece type, the entire model for each work piece type is specified by a combination of a plurality of partial models, and each of the plurality of partial models is correspondently given a degree of importance. The step of executing at least one of the detection and the specification includes a step of determining whether or not the three-dimensional shape is consistent with any one entire model based on the degrees of importance corresponding to one or more partial models included in the entire model.

BRIEF DESCRIPTION OF THE DRAWINGS

FIGS. 12($a$)-12($c$) are diagrams illustrating an improvement in recognition accuracy of object recognition using a weighting coefficient (a degree of priority) in the measurement system according to the present embodiment.

DESCRIPTION OF THE EMBODIMENTS

Figure 1:
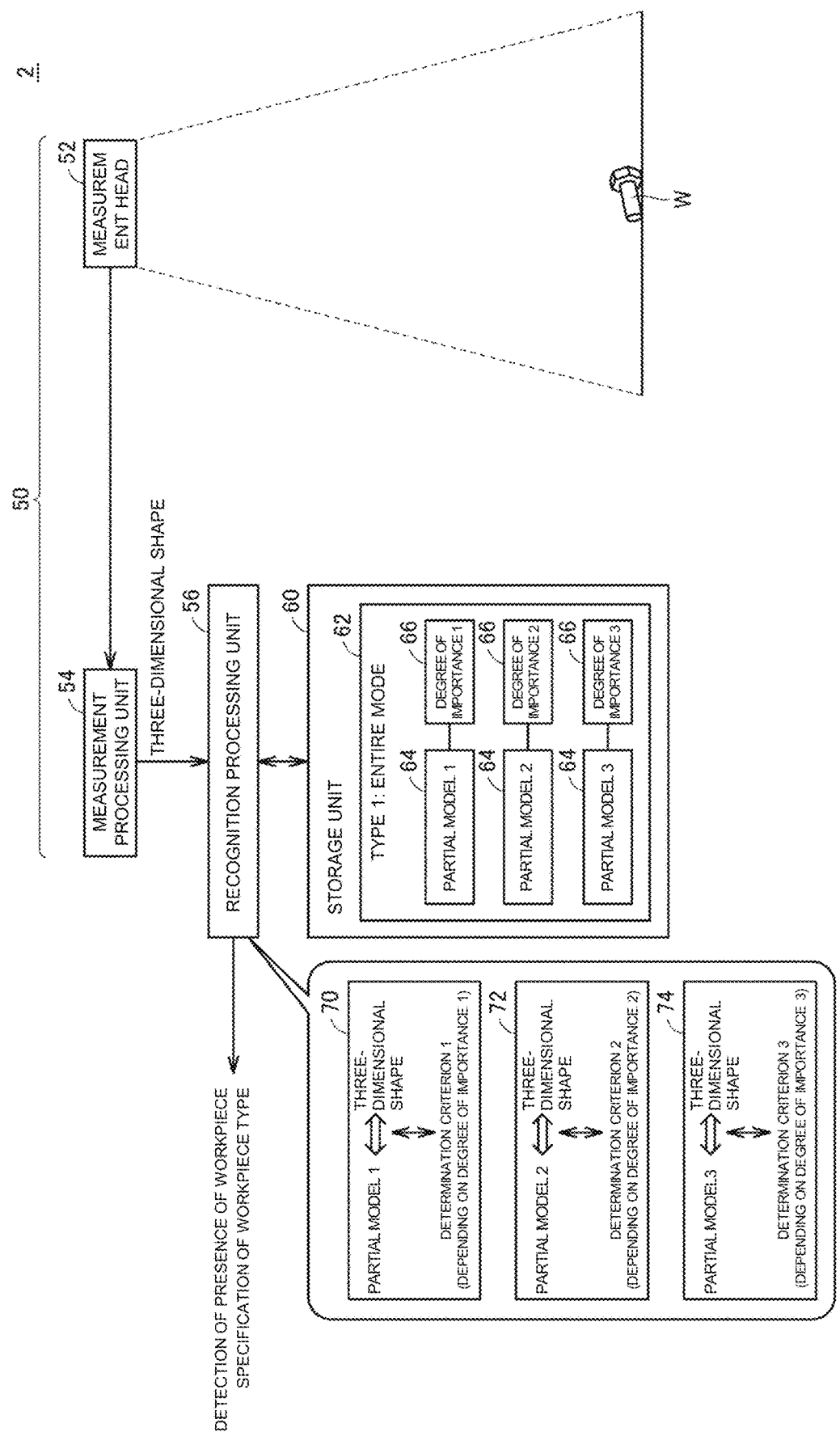
FIG. 1 is a schematic view illustrating an application example of a measurement system according to the present embodiment.

An embodiment of the present disclosure will be described in detail with reference to the accompanying drawings. Meanwhile, the same or equivalent portions in the drawing are denoted by the same reference numerals and signs, and description thereof is not repeated.

A. Application Example

First, an example of a scene to which the present disclosure is applied will be described.

FIG. 1 is a schematic view illustrating an application example of a measurement system 2 according to the present embodiment. Referring to FIG. 1, the measurement system 2 measures a three-dimensional shape of a work piece W disposed at a predetermined position and executes object recognition to be described later based on the measured three-dimensional shape. The measurement system 2 includes a shape measurement unit 50, a storage unit 60, and a recognition processing unit 56.

The shape measurement unit 50 includes a measurement head 52 which is a device optically measuring the three-dimensional shape of the work piece W disposed at a predetermined position and includes an optical system, and a measurement processing unit 54 that processes an electrical signal from the measurement head 52. The shape measurement unit 50 includes an imaging unit (measurement head 52) that images the work piece W disposed at the predetermined position.

The storage unit 60 previously stores a three-dimensional shape indicating an entire model 62 for each work piece type. The entire model 62 for each work piece type is specified by a combination of a plurality of partial models 64. Further, a corresponding degree of importance 66 is imparted to each of the plurality of partial models 64.

The recognition processing unit 56 executes at least one of detection of the presence of a work piece and specification of a work piece type based on whether the three-dimensional shape measured by the shape measurement unit 50 is consistent with any one entire model 62 stored in the storage unit 60.

In the present specification, a process of performing detection of the presence of a work piece W and a process of performing specification of a work piece type of by collating a measured three-dimensional shape with an entire model registered in advance will be collectively referred to as "object recognition" or an "object recognition process".

The recognition processing unit 56 determines whether or not the measured three-dimensional shape is consistent with any one entire model 62 based on degrees of importance 66 corresponding to one or more partial models 64 included in the entire model 62 (process 70).

Typically, in a case that a degree of consistency between each partial model 64 and the measured three-dimensional shape exceeds a threshold value that is calculated based on the degrees of importance 66 imparted to the partial models 64, it is determined that the partial models 64 are consistent with the measured three-dimensional shape. In a case that a determination criterion corresponding to all of the partial models 64 included in the entire model 62 is satisfied, it may be determined that the measured three-dimensional shape is consistent with the entire model 62.

Alternatively, in a case that a determination criterion corresponding to some partial models 64 is satisfied, it may be determined that the measured three-dimensional shape is consistent with the entire model 62. For example, the partial models 64 having a predetermined proportion among the plurality of partial models 64 constituting the entire model 62 satisfy a determination criterion or the partial models 64 having a higher priority satisfy the determination criterion, it may be determined that the measured three-dimensional shape is consistent with the corresponding entire model 62.

With such a configuration, in a case that object recognition is performed using an entire model, non-recognition (that is, the presence of a work piece cannot be detected) may occur due to disturbance or the like. However, according to the present embodiment, it is possible to suppress such non-recognition. In addition, in a case that a partial model is used without considering the degree of importance, there is a possibility that erroneous recognition (that is, an erroneous work piece type is output) may occur. However, according to the present embodiment, it is possible to suppress such erroneous recognition.

B. Overall Configuration of Picking System 1

First, the overall configuration of a picking system 1 according to the present embodiment will be described.

Figure 2:
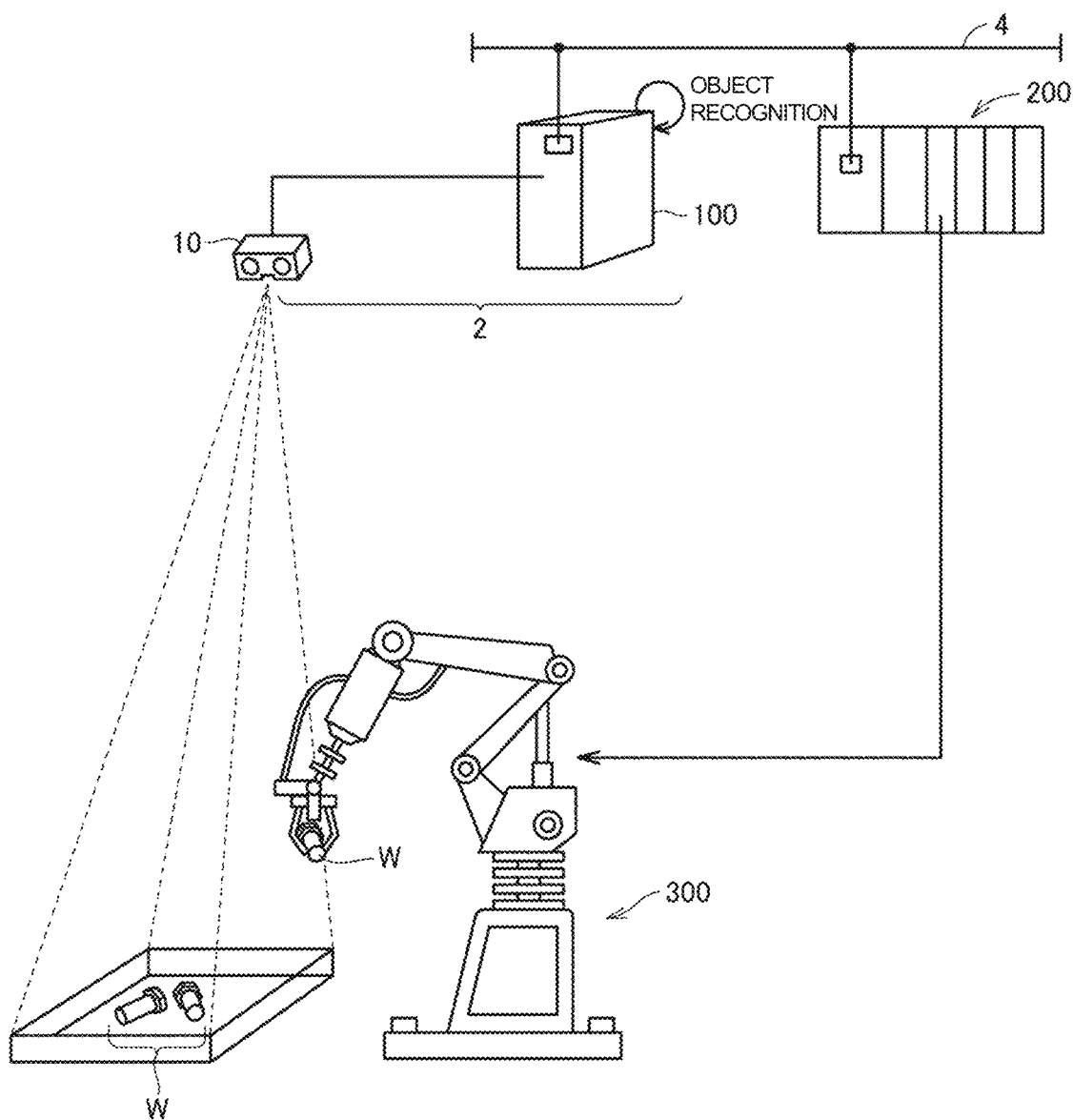
FIG. 2 is a schematic view illustrating the overall configuration of a picking system according to the present embodiment.

FIG. 2 is a schematic view illustrating the overall configuration of the picking system 1 according to the present embodiment. Referring to FIG. 2, in the picking system 1, a robot 300 holds a work piece W disposed at a picking position and moves and disposes the work piece at a place position not shown in the drawing. Typically, the work piece W is appropriately transported by a transport device, not shown in the drawing, or the like and stacked in bulk.

The picking system 1 includes the measurement system 2 that optically measures a three-dimensional shape of the work piece W, and collates the three-dimensional shape obtained by measuring a picking position by the measurement system 2 with an entire model registered in advance to perform detection of the presence of the work piece W at the picking position and specification of a work piece type (object recognition).

The measurement system 2 gives an instruction of the position and direction of the recognized work piece W to the control device 200, so that the control device 200 gives a command for holding and moving the recognized work piece W to the robot 300.

The measurement system 2 includes a measurement head 10, and an image measurement device 100 connected to the measurement head 10. The measurement head 10 and the image measurement device 100 are equivalent to the shape measurement unit 50. The image measurement device 100 includes a recognition processing unit 56 and a storage unit 60.

As a typical example, the measurement system 2 realizes three-dimensional measurement using a method referred to as structured illumination. In the structured illumination method, a work piece is irradiated with measurement light, and a distance to the work piece is measured based on an image obtained by imaging the work piece in a state where measurement light is projected. As such a structured illumination method, a space coding method, a phase shift method, a light sectioning method and the like can be used.

The measurement head 10 includes a light projection unit that emits measurement light and an imaging unit that images a work piece in a state where measurement light is projected. A range in which measurement light is emitted from the light projection unit and a range in which the imaging unit performs imaging are configured to be substantially consistent with each other. The measurement light emitted from the light projection unit may be pattern light having a predetermined shading pattern or may be slit light having a predetermined width.

The image measurement device 100 calculates a measurement result indicating a three-dimensional shape of a work piece which is present within a visual field of the imaging unit, based on the image captured by the imaging unit of the measurement head 10. The image measurement device 100 collates the measured three-dimensional shape with model data registered in advance to perform object recognition, that is, detection of the presence of a work piece W and specification of a work piece type.

Further, the image measurement device 100 outputs the position and direction of the recognized work piece W to the control device 200 connected through a network 4.

Typically, the control device 200 is constituted by a programmable controller (PLC) or the like and gives an operation instruction (a command for holding and moving the recognized work piece W) to the robot 300 based on information on the position and direction of the work piece W which is received from the image measurement device 100.

C. Configuration Example of Measurement System 2

Next, an example of a device configuration included in the measurement system 2 will be described.

(c1: Measurement Head 10)

Figure 3:
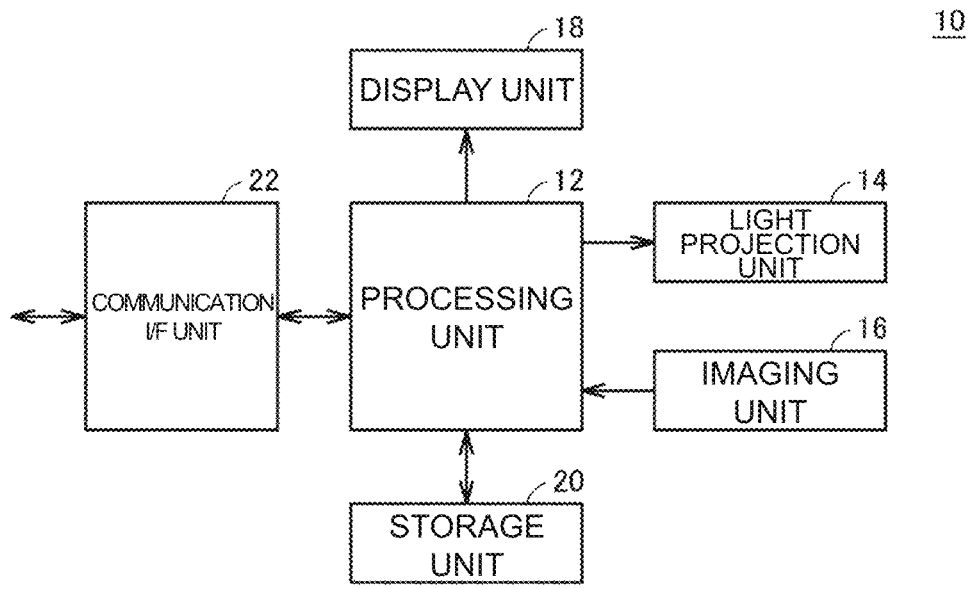
FIG. 3 is a schematic view illustrating a configuration example of a measurement head included in the measurement system according to the present embodiment.

FIG. 3 is a schematic view illustrating a configuration example of the measurement head 10 included in the measurement system 2 according to the present embodiment. Referring to FIG. 3, the measurement head 10 includes a processing unit 12, a light projection unit 14, an imaging unit 16, a display unit 18, and a storage unit 20.

The processing unit 12 performs the overall processing in the measurement head 10. Typically, the processing unit 12 includes a processor, a storage that stores a command code executed by the processor, and a memory that develops the command code. In this case, in the processing unit 12, the processor realizes various processes by developing the command code on the memory and executing the command code. Some or all of the components included in the processing unit 12 may be mounted using a dedicated hardware circuit (for example, an application specific integrated circuit (ASIC), a field-programmable gate array (FPGA), or the like).

The display unit 18 gives a notice of various information acquired or calculated in the measurement head 10 to the outside.

The storage unit 20 stores an image captured by the imaging unit 16, calibration parameters which are set in advance, and the like.

A communication interface (I/F) unit 22 takes charge of exchanging data between the measurement head 10 and the image measurement device 100.

(c2: Image Measurement Device 100)

Figure 4:
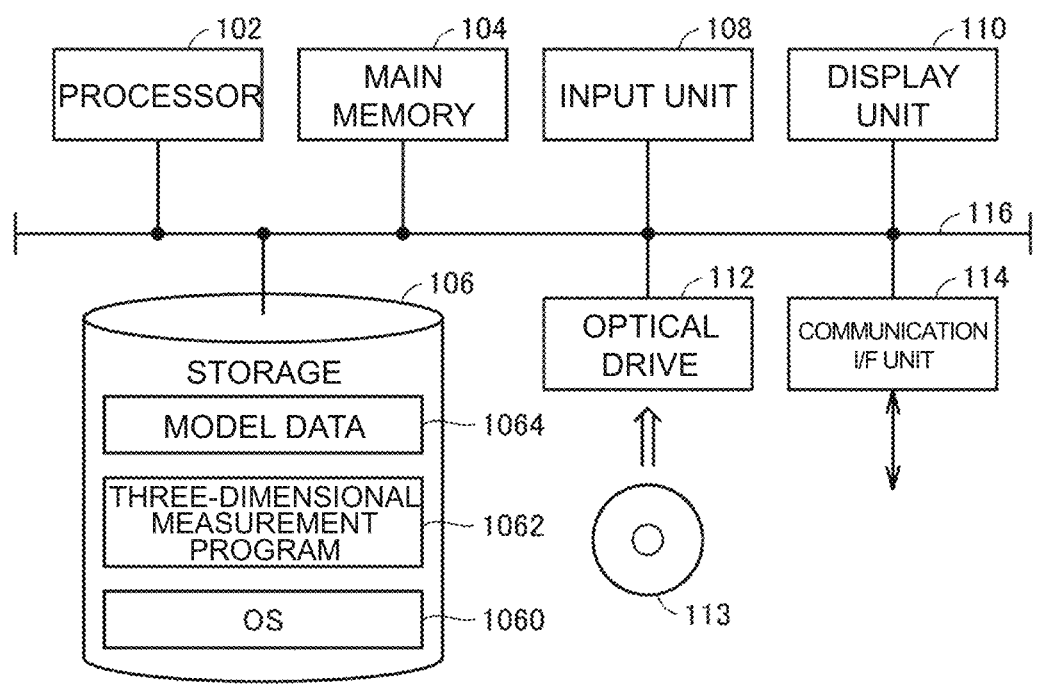
FIG. 4 is a schematic view illustrating a configuration example of an image measurement device included in the measurement system according to the present embodiment.

FIG. 4 is a schematic view illustrating a configuration example of the image measurement device 100 included in the measurement system 2 according to the present embodiment. Typically, the image measurement device 100 is realized using a general-purpose computer. Referring to FIG. 4, the image measurement device 100 includes a processor 102, a main memory 104, a storage 106, an input unit 108, a display unit 110, an optical drive 112 and a communication interface (I/F) unit 114. These components are connected to each other through a processor path 116.

The processor 102, which is constituted by a central processing unit (CPU), a graphics processing unit (GPU) or the like, reads out a program (as an example, an OS 1060 and a three-dimensional measurement program 1062) stored in the storage 106, develops and executes the program in the main memory 104, so as to realize various processes to be described later.

The main memory 104 is constituted by a volatile storage device such as a dynamic random access memory (DRAM) or a static random access memory (SRAM), or the like. The storage 106 is constituted by a non-volatile storage device such as a hard disk drive (HDD) or a solid state drive (SSD).

The storage 106 stores the three-dimensional measurement program 1062 for providing a function as the image measurement device 100 and model data 1064 used for object recognition, in addition to the OS 1060 for realizing basic functions.

The input unit 108 is constituted by a keyboard, a mouse or the like and receives a user's operation. The display unit 110 is constituted by a display, various indicators, printers or the like and outputs processing results received from the processor 102, and the like.

The communication interface unit 114 takes charge of exchanging data with another device through the network 4 (see FIG. 2).

The image measurement device 100 includes an optical drive 212, and a program stored in a recording medium 213 (for example, an optical recording medium such as a digital versatile disc (DVD)) which non-transitorily stores a computer-readable program is read from this recording medium and is installed in the storage 106 or the like.

The three-dimensional measurement program 1062 executed by the image measurement device 100, and the like may be installed through the computer-readable recording medium 113, but may be installed in the form of being downloaded from a server device or the like on a network. In addition, a function provided by the three-dimensional measurement program 1062 according to the present embodiment may be realized in the form of using some of modules provided by the OS.

FIG. 4 illustrates a configuration example in which functions required for the image measurement device 100 are provided by the processor 102 executing a program, but the image measurement device may be equipped with some or all of these provided functions using a dedicated hardware circuit (for example, an ASIC, an FPGA or the like).

D. Outline

Figure 5:
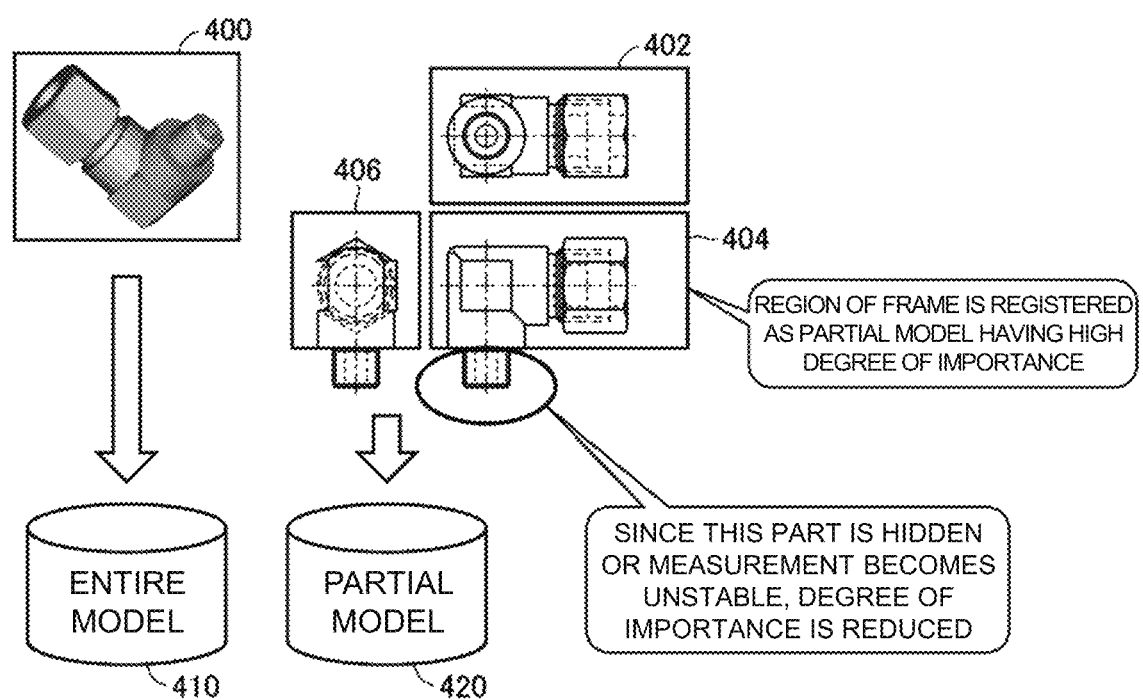
FIG. 5 is a diagram illustrating an outline of object recognition performed by the measurement system according to the present embodiment.

Next, an outline of object recognition performed by the measurement system 2 according to the present embodiment will be described. FIG. 5 is a diagram illustrating an outline of object recognition performed by the measurement system 2 according to the present embodiment.

Referring to FIG. 5, design data 400 obtained from computer-aided design (CAD) data or the like is registered as an entire model 410. In addition, a partial model 420 obtained by dividing the design data 400 into one or a plurality of portions is also registered.

For example, the partial model 420 is generated by a user who arbitrarily sets model registration ranges 402, 404 and 406 with respect to the design data 400.

In the present embodiment, the degree of importance is set for one or a plurality of partial models constituting an entire model.

In the present specification, the "degree of importance" means the degree of priority or a weighting coefficient in a collation process of an object recognition process, and there is an increasing possibility that it is determined that the degree of consistency with a corresponding entire model increases as a partial model for which a higher degree of importance is set and a measured three-dimensional shape are consistent with each other. In other words, regarding a partial model having a low degree of importance, influence to be exerted on determination that a measured three-dimensional shape is consistent with an entire model is reduced, in spite of inconsistency with the three-dimensional shape. In the following description, a "weighting coefficient" is used as a typical example of the "degree of importance".

The model registration ranges 402, 404 and 406 illustrated in FIG. 5 specify a partial model having a high degree of importance, and a region surrounded by the model registration ranges 402, 404 and 406 is of a high degree of importance and registered as a partial model.

On the other hand, regions other than the region surrounded by the model registration ranges 402, 404 and 406 are portions which are hidden from the imaging unit 16 of the measurement head 10 (out of a visual field range) or in which measurement becomes unstable, and the degree of importance at the time of registering the regions as partial models is reduced.

In the measurement system 2 according to the present embodiment, an entire model is registered as a set of a plurality of partial models each of which is given the degree of importance, and it is determined whether or not a measured three-dimensional shape is consistent with any one entire model based on whether or not the measured three-dimensional shape is consistent with each of the partial models (or the degree of consistency) and corresponding degrees of importance.

E. Processing Procedure

Next, a processing procedure in the measurement system 2 according to the present embodiment will be described. A process executed in the measurement system 2 according to the present embodiment basically includes two processes including a process of registering a model and a process of performing object recognition using the registered model.

(e1: Model Registration)

Figure 6:
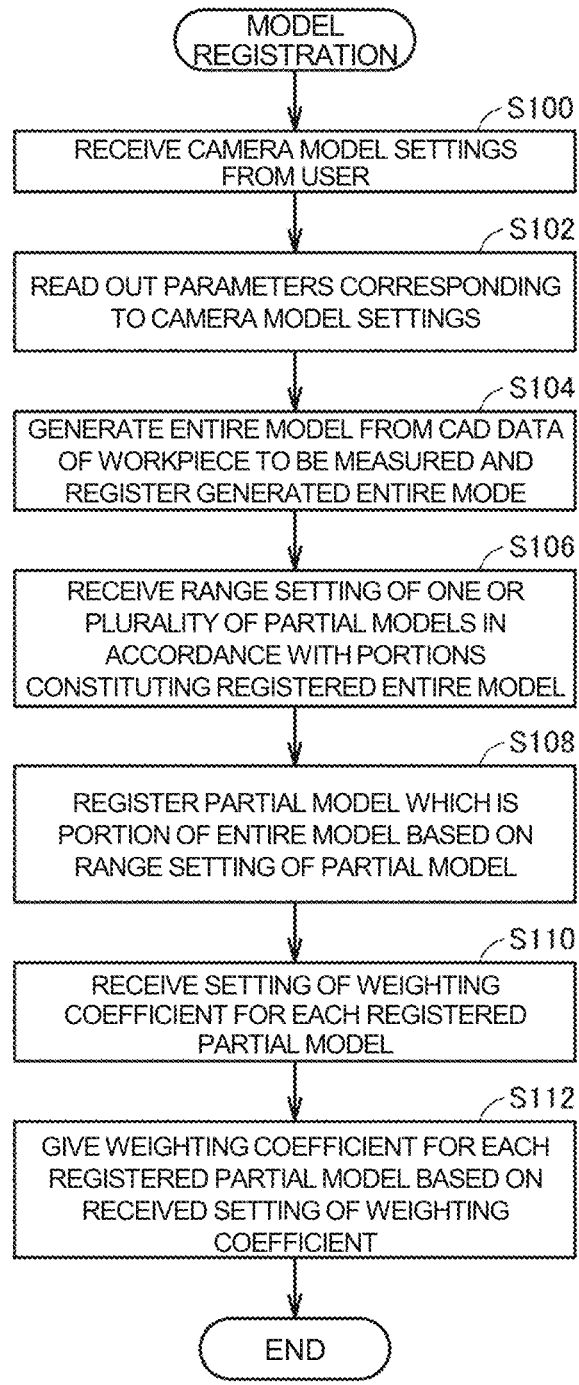
FIG. 6 is a flowchart illustrating a processing procedure of model registration in the measurement system according to the present embodiment.

FIG. 6 is a flowchart illustrating a processing procedure of model registration in the measurement system 2 according to the present embodiment. Typically, steps illustrated in FIG. 6 are realized by the processor 102 of the image measurement device 100 executing the three-dimensional measurement program 1062.

Referring to FIG. 6, the image measurement device 100 receives camera model setting from a user (step S100). The camera model setting is information indicating the type of optical system of the measurement head 10. As will be described later, an optimal partial model and the degree of importance (weighting coefficient) are set in accordance with the size of a work piece seen within a captured image, or the like in accordance with an imaging visual field, an angle of view and the like based on the camera model setting.

The image measurement device 100 reads out parameters corresponding to the camera model setting given in step S100 (step S102). The parameters read out in step S102 include a minimum measurement width which is the accuracy of measurement in the current camera setting.

The image measurement device 100 generates an entire model from CAD data of a work piece to be measured and registers the generated entire model (step S104). Subsequently, the image measurement device 100 receives range setting of one or a plurality of partial models in accordance with portions constituting the registered entire model (step S106). In addition, the image measurement device 100 registers a partial model which is a portion of the entire model based on the range setting of the partial model (step S108).

Further, the image measurement device 100 receives the setting of a weighting coefficient for each partial model registered in step S108 (step S110). In addition, the image measurement device 100 gives the weighting coefficient for each registered partial model based on the received setting of the weighting coefficient (step S112).

The model registration process is completed according to the above-described procedure. In a case that a plurality of types of work pieces are set to be targets for object recognition, the processing procedure illustrated in FIG. 6 is repeatedly executed by the types of work pieces.

(e2: Object Recognition)

Figure 7:
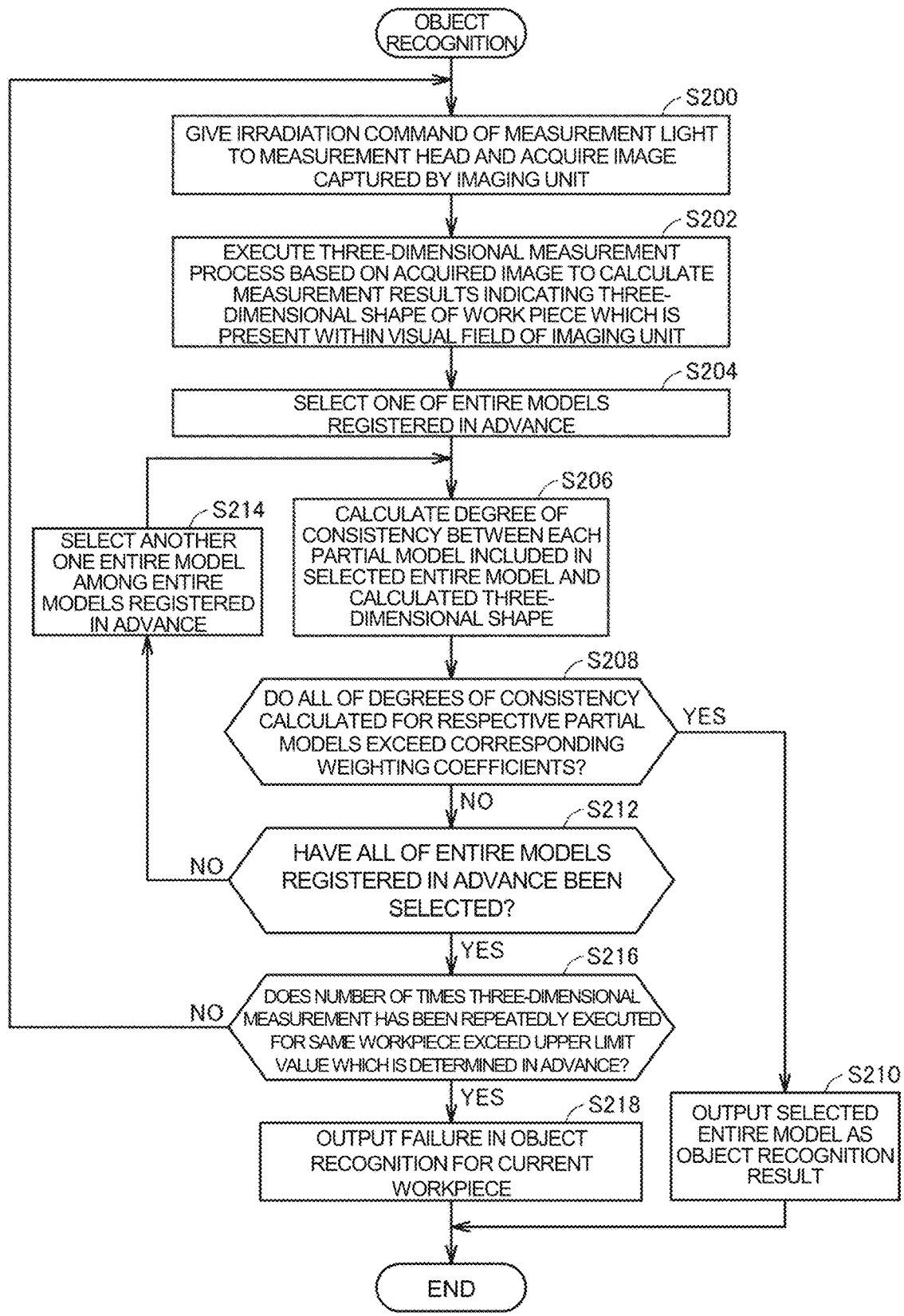
FIG. 7 is a flowchart illustrating a processing procedure of object recognition in the measurement system according to the present embodiment.

FIG. 7 is a flowchart illustrating a processing procedure of object recognition in the measurement system 2 according to the present embodiment. Typically, steps illustrated in FIG. 7 are realized by the processor 102 of the image measurement device 100 executing the three-dimensional measurement program 1062.

Referring to FIG. 7, first, the image measurement device 100 gives an irradiation command of the measurement light to the measurement head 10 and acquires an image captured by the imaging unit 16 of the measurement head 10 (step S200). The image measurement device 100 executes a three-dimensional measurement process based on the acquired image to calculate a measurement result indicating a three-dimensional shape of a work piece which is present within a visual field of the imaging unit 16 of the measurement head 10 (step S202). That is, in steps S200 and S202, a process of optically measuring a three-dimensional shape of a work piece disposed at a predetermined position is executed.

The image measurement device 100 selects one of entire models registered in advance (step S204) and calculates the degree of consistency between each partial model included in the selected entire model and the calculated three-dimensional shape (step S206). In addition, the image measurement device 100 determines whether or not all of the degrees of consistency calculated for the respective partial models exceed the corresponding weighting coefficients (step S208). That is, in steps S206 and S208, at least one of detection of the presence of a work piece and specification of a work piece type is executed based on whether or not a measured three-dimensional shape is consistent with any one entire model stored in advance.

In step S208, it is determined whether or not the three-dimensional shape is consistent with the entire model based on weighting coefficients (degrees of importance) corresponding to one or more partial models included in any one entire model.

In a case that all of the degrees of consistency calculated for the respective partial models exceed the corresponding weighting coefficients (in a case of YES in step S208), the image measurement device 100 outputs the selected entire model as an object recognition result (step S210). In addition, the process is terminated.

On the other hand, in a case that any one degree of consistency calculated for the partial model is equal to or less than the corresponding weighting coefficient (in a case of NO in step S208), the image measurement device 100 determines that the three-dimensional shape is not consistent with the selected entire model. In this manner, the weighting coefficient may be used as a determination criterion. Since the weighting coefficient means the density of a measurement point as will be described later, the degree of importance is obtained by reflecting the number of measurement points on the surface of the work piece W measured by the shape measurement unit 50.

In addition, the image measurement device 100 determines whether or not all of the entire models registered in advance have been selected (step S212). In a case that there is an entire model which has not yet been selected among the entire models registered in advance (in a case of NO in step S212), the image measurement device 100 selects another one entire model among the entire models registered in advance (step S214) and repeats the process of step S206 and the subsequent processes.

In a case that all of the entire models registered in advance have been selected (in a case of YES in step S212), the image measurement device 100 determines whether or not the number of times three-dimensional measurement is repeatedly executed for the same work piece exceeds an upper limit value which is determined in advance (step S216).

In a case that the number of times three-dimensional measurement is repeatedly executed for the same work piece does not exceed the upper limit value which is determined in advance (in a case of NO in step S216), the process of step S200 and the subsequent processes are repeated.

On the other hand, in a case that the number of times three-dimensional measurement is repeatedly executed for the same work piece exceeds the upper limit value which is determined in advance (in a case of YES in step S216), a failure in object recognition for the current work piece is output (step S218). In addition, the process is terminated.

F. Model Registration

Next, processing contents of model registration illustrated in FIG. 6 will be described in detail.
(f1: Camera Model Setting)

Figures 8, 9:
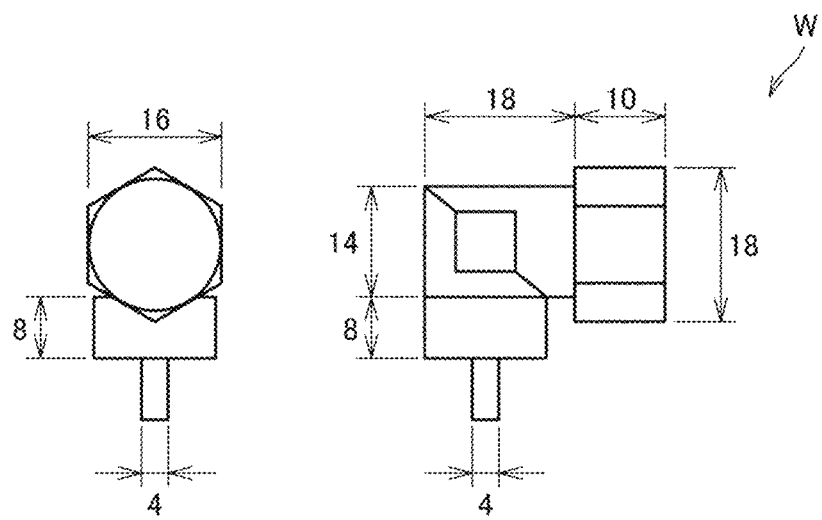
FIG. 8 is a diagram illustrating an example of camera model setting managed by the measurement system according to the present embodiment.
FIG. 9 is a diagram illustrating an example of a work piece which is a target for object recognition of the measurement system according to the present embodiment.

First, the camera model setting used in step S102 of FIG. 6 will be described. FIG. 8 is a diagram illustrating an example of a camera model setting 440 managed by the measurement system 2 according to the present embodiment. In the example illustrated in FIG. 8, three types of camera models 442 are specified. Specifically, there are three types including a narrow visual field type, a medium visual field type and a wide visual field type.

A visual field specification 444 is specified in association with each camera model 442. The visual field specification 444 specifies a visual field range in a case that an optical system corresponding to each camera models 442 is adopted. A minimum measurement width 446 is further specified in association with each camera model 442. The minimum measurement width 446 specifies a measurable minimum width and is determined based on the corresponding visual field range and resolution.

A weighting coefficient range 448 is further specified in association with each camera model 442. The weighting coefficient range 448 specifies the range of a weighting coefficient which is determined in accordance with a visual field range and the like of each camera model 442. The weighting coefficient is specified in accordance with the density of points capable of being imaged by the imaging unit 16 of the measurement head 10 (the number of measurement points included in a shading pattern (measurement light) projected by the light projection unit 14 of the measurement head 10) and means a point group ratio as will be described later.

As illustrated in FIG. 8, parameters corresponding to the camera model setting include the visual field specification 444, the minimum measurement width 446 and the weighting coefficient range 448.
(f2: Entire Model and Partial Model)

Next, an entire model and a partial model shown in steps S104 to S108 of FIG. 6 will be described.

FIG. 9 is a diagram illustrating an example of a work piece W which is a target for object recognition of the measurement system 2 according to the present embodiment. As illustrated in FIG. 9, a work piece W which is a combination of a plurality of portions is assumed.

Figure 10B:
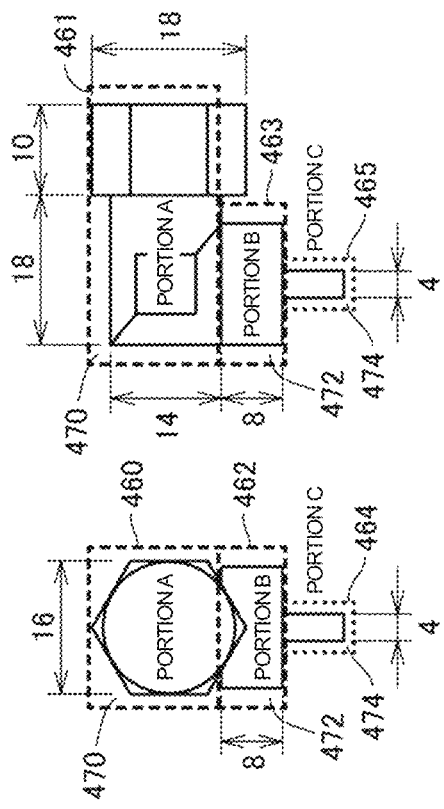
FIGS. 10(A) and 10(B) are diagrams illustrating a registration processing procedure of an entire model and partial models in the measurement system according to the present embodiment.
Figure 10A:
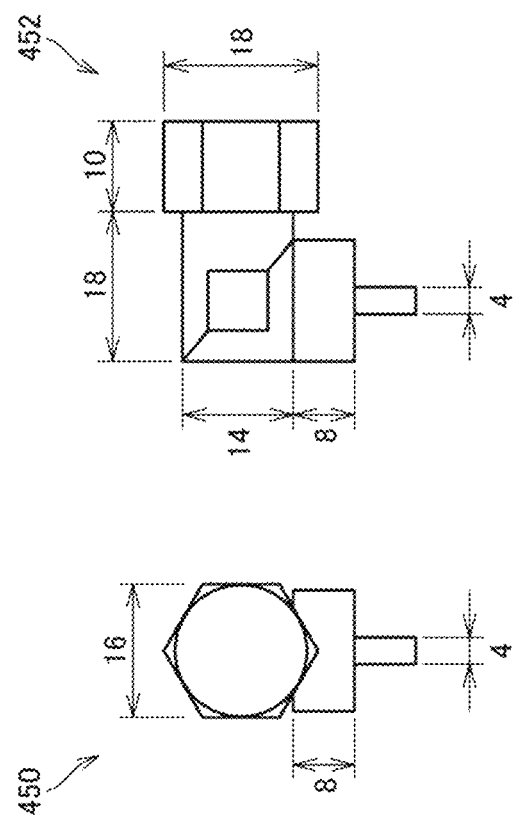

FIGS. 10(A) and 10(B) are diagrams illustrating a registration processing procedure of an entire model and a partial model in the measurement system 2 according to the present embodiment. In the drawing of FIGS. 10(A) and 10(B), numerals indicating respective portions of a work piece are written, but this is for convenience and do not affect the essential technical idea of the present disclosure.

FIG. 10(A) illustrates an example of CAD data of a work piece. In general, CAD data is information indicating a three-dimensional shape of a work piece and can be expressed by setting a visual point in any direction. FIG. 10(A) illustrates a front view 450 of the work piece and a side view 452 of the work piece. An entire model of the work piece is created and registered from the CAD data as illustrated in FIG. 10(A).

FIG. 10(B) illustrates a state that a plurality of regions 460 to 465 are set for the CAD data illustrated in FIG. 10(A). More specifically, FIG. 10(B) illustrates an example in which three partial models 470, 472 and 474 (a portion A, a portion B and a portion C) are set based on the setting of the plurality of regions 460 to 465.

That is, the partial model 470 (portion A) is set by the region 460 which is set for the front view of the work piece and the region 461 which is set for the side view of the work piece. Similarly, the partial model 472 (portion B) is set by the region 462 which is set for the front view of the work piece and the region 463 which is set for the side view of the work piece. Similarly, the partial model 474 (portion C) is set by the region 464 which is set for the front view of the work piece and the region 465 which is set for the side view of the work piece.

A setting procedure for the partial models illustrated in FIGS. 10(A) and 10(B) is repeated by the number of types of work pieces which are targets for object recognition.

As illustrated in FIGS. 10(A) and 10(B), the measurement system 2 according to the present embodiment has a model registration function of receiving design data (CAD data) of a work piece and dividing a three-dimensional shape specified by the received design data into a plurality of partial shapes (partial models) in accordance with a user's operation. The model registration function of the measurement system 2 may further give the degree of importance to the partial shapes obtained by the division in accordance with a user's operation.

In this manner, one or a plurality of partial models are set and registered by dividing the entire model generated from the CAD data of the work piece. For this reason, it is possible to simplify a process of registration of an entire model and a partial model as compared to a case that a work piece is actually imaged.

(f3: Weighting Coefficient (Degree of Priority))

Next, weighting coefficients (degrees of priority) given to the respective partial models illustrated in steps S108 to S110 of FIG. 6 will be described.

Figure 11:
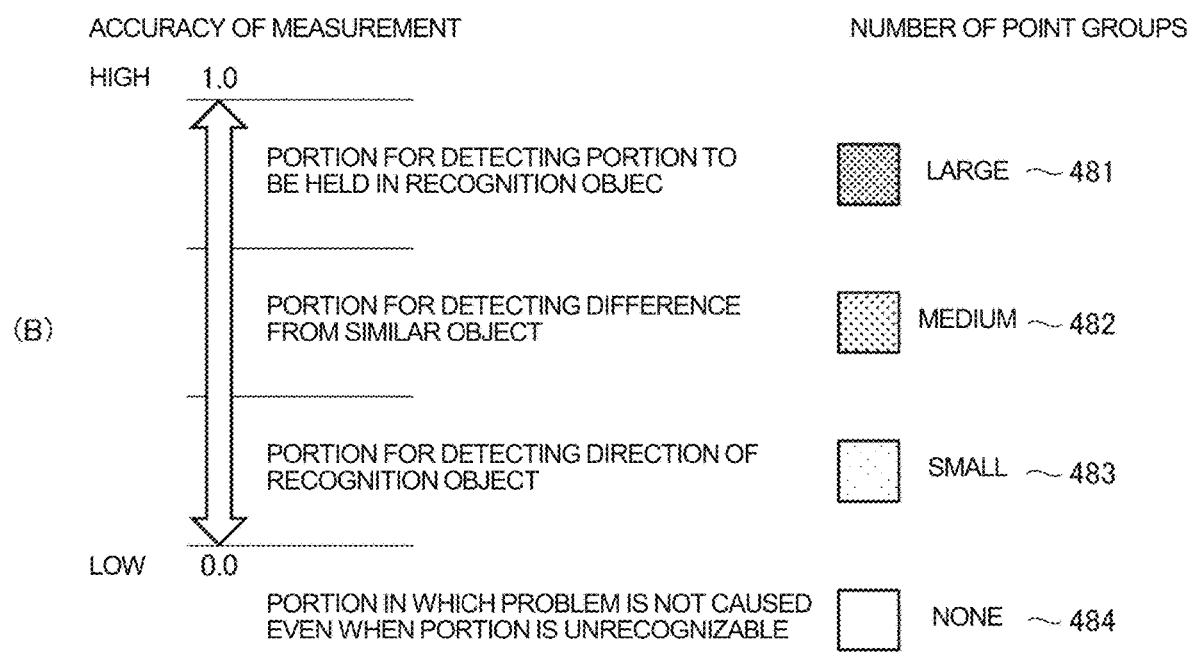
FIG. 11 has (A) part and (B) part and is a diagram illustrating a weighting coefficient (a degree of priority) in the measurement system according to the present embodiment.

FIG. 11 is a diagram illustrating a weighting coefficient (a degree of priority) in the measurement system 2 according to the present embodiment.

Referring to part (A) of FIG. 11, a weighting coefficient means a point group ratio and means a ratio of an expected number of point groups to an ideal number of point groups per unit area.

The ideal number of point groups per unit area means a maximum number of detectable measurement points which is determined by a spatial frequency included in a shading pattern projected by measurement light, a visual field range specified by the optical system of the imaging unit 16 of the measurement head 10, and the like. The expected number of point groups means the number of measurement points to be measured per unit area in accordance with the degree of importance of a corresponding partial model.

In a case that height information (distance information from the measurement head 10) is calculated for each measurement point, the ideal number of point groups per unit area means the accuracy of measurement or a resolution of detection. In addition, a weighting coefficient (point group ratio) indicates the degree of resolution at which a measurement result is obtained with respect to a resolution to be originally measured.

It is possible to specify the accuracy of measurement which is a criterion for determining that consistency with a partial model is made, that is permissible indeterminacy by using such a weighting coefficient. That is, an erroneous recognition is not permitted, and a higher accuracy of measurement (the degree of importance) is set for partial models.

A weighting coefficient (that is, the degree of importance) is appropriately given in accordance with a role of each partial model for each application, so that it is possible to prevent erroneous recognition of object recognition for a work piece (that is, an erroneous work piece type is output) and to reduce non-recognition (that is, the presence of a work piece cannot be detected).

Part (B) of FIG. 11 illustrates an example of a relationship between a role of each partial model for each application and the number of point groups. FIG. 11(B) illustrates four types of coefficient classifications 481, 482, 483 and 484 of weighting coefficients in accordance with the number of point groups.

The coefficient classification 481 is a classification having the largest number of point groups and is given to, for example, a partial model equivalent to a portion for detecting a portion to be held in a recognition object.

The coefficient classification 482 is a classification having the second largest number of point groups and is given to, for example, a partial model equivalent to a portion for detecting a difference from a similar object.

The coefficient classification 483 is a classification having the third largest number of point groups and is given to, for example, a partial model equivalent to a portion for detecting the direction of a recognition object.

The coefficient classification 484 is a classification having the smallest number of point groups and is given to a partial model equivalent to a portion which does not cause trouble even when the portion is unrecognizable.

It is possible to suppress erroneous recognition and non-recognition by appropriately giving such coefficient classification 481 to 484 to respective partial models.

FIGS. 12(a)-12(c) are diagrams illustrating an improvement in recognition accuracy of object recognition using a weighting coefficient (a degree of priority) in the measurement system 2 according to the present embodiment. For example, an application in which a target work piece (target article 501) and a similar article 502 having a shape similar to that of the target article 501 are mixedly provided is assumed (see the column of (1) CAD data). In this case, the disposition direction of the target article 501 is not fixed.

A main portion (a portion held by the robot 300) of the target article 501 is specified as a partial model (equivalent to the portion A illustrated in FIG. 10), and the highest weighting coefficient (point group ratio) is given to the partial model. In a case that a measurement result 511 of three-dimensional measurement of any one work piece W (see the column of (2) three-dimensional measurement) is obtained by giving such a weighting coefficient, it is determined that a portion result 514 included in the measurement result 511 is consistent with the portion A. In addition, an object recognition result 521 indicating that the target work piece is the target article 501 is obtained based on determination that the portion result 514 is consistent with the portion A (see the column of (3) object recognition). In addition, a holding portion is specified from the position of the portion result 514, and the posture of the target work piece is specified from the direction of the portion result 514.

The vicinity (a portion different from the similar article 502) of the main portion of the target article 501 is specified as a partial model (equivalent to the portion B illustrated in FIGS. 10(A) and 10(B)), and the second highest weighting coefficient (point group ratio) is given to the partial model. In a case that a measurement result 512 of three-dimensional measurement of any one work piece W (see the column of (2) three-dimensional measurement) is obtained by giving such a weighting coefficient, it is determined that a portion result 515 included in the measurement result 512 is consistent with the portion A. In addition, it is determined that a portion result 516 included in the measurement result 512 is consistent with the portion B. In this case, the portion result 515 is consistent with the portion A, and an object recognition result 522 indicating that the target work piece is the target article 501 instead of the similar article 502 is obtained based on determination that the portion result 516 is consistent with the portion B (see the column of (3) object recognition). In this manner, in the example illustrated in FIGS. 12(a)-12(c), information of a partial model corresponding to the portion B is used as information for distinguishing the target article 501 from the similar article 502.

Further, in the example illustrated in FIGS. 12(a)-12(c), information of a partial model corresponding to the portion B is used as information for specifying a difference in the direction of the target article 501. For example, in a case that a measurement result 513 of three-dimensional measurement of any one work piece W (see the column of (2) three-dimensional measurement) is obtained, it is determined that a portion result 517 included in the measurement result 513 is consistent with the portion A. In addition, it is determined that a portion result 518 included in the measurement result 513 is consistent with the portion B. In this case, an object recognition result 523 indicating that the target work piece is the target article 501 and the direction thereof is opposite to the direction of a registered entire model (see the column of (3) object recognition) is obtained based on determination that the portion result 517 is consistent with the portion A and the portion result 518 is consistent with the portion B and a positional relationship between the portion result 517 and the portion result 518. In this manner, in the example illustrated in FIGS. 12(*a*)-12(*c*), information of a partial model corresponding to the portion B is used as information for specifying a difference in the direction of the target article 501.

In this manner, it is possible to realize object recognition based on an application by registering one or a plurality of partial models included in an entire model and giving weighting coefficients to the respective partial models.

(f4: Registration of Partial Model Based on Visual Field or Resolution of Imaging Unit)

Next, a registration example of a partial model based on a visual field range of the imaging unit 16 of the measurement head 10 will be described.

Figure 13A:
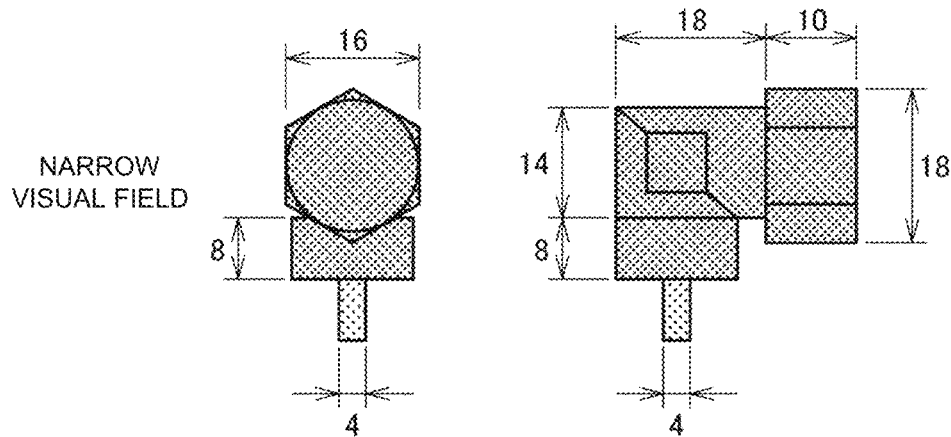
FIGS. 13($a$)-13($c$) are diagrams illustrating an example of measurement results based on a visual field of an imaging unit in the measurement system according to the present embodiment.
Figure 13B:
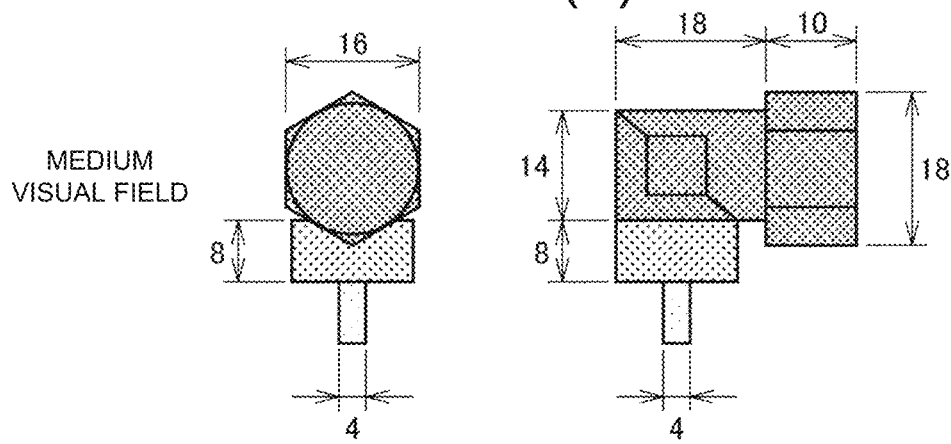
Figure 13C:
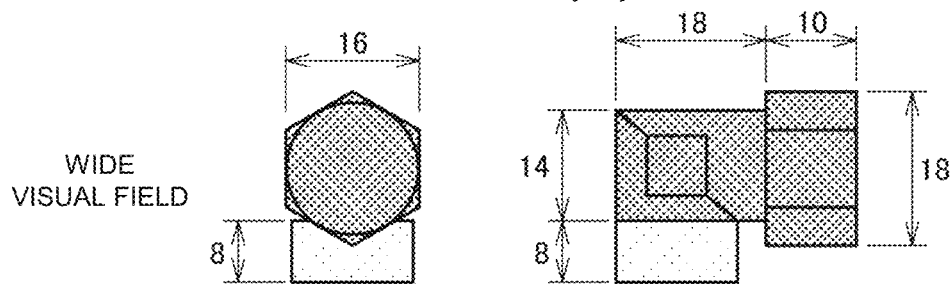

FIGS. 13(*a*)-13(*c*) is a diagram illustrating an example of a measurement result based on a visual field of the imaging unit 16 in the measurement system 2 according to the present embodiment. FIG. 13(*a*) illustrates an example of a measurement result in a case that a measurement head 10 of a narrow visual field type is used, FIG. 13(*b*) illustrates an example of a measurement result in a case that a measurement head 10 of a medium visual field type is used, and FIG. 13(*c*) illustrates an example of a measurement result in a case that a measurement head 10 of a wide visual field type is used.

In a case that where a visual field range of the measurement head 10 is narrow, the accuracy of measurement becomes relatively higher, and thus it is possible to appropriately measure a three-dimensional shape of a target work piece as illustrated in FIG. 13(*a*).

When the visual field range of the measurement head 10 becomes wider than in the example illustrated in FIG. 13(*a*), the accuracy of measurement becomes relatively lower. Therefore, the density of measurement points with which a portion of the target work piece is irradiated is reduced as illustrated in FIG. 13(*b*), and thus the accuracy of measurement of a three-dimensional shape is also reduced. However, according to the measurement result illustrated in FIG. 13(*b*), a three-dimensional shape of the entire target work piece can be measured.

When the visual field range of the measurement head 10 becomes further wider than in the example illustrated in FIG. 13(*b*), a portion of the target work piece cannot be irradiated with measurement points having an appropriate density as illustrated in FIG. 13(*c*), and thus a three-dimensional shape of a portion of the work piece cannot be measured appropriately.

Meanwhile, although not shown in FIGS. 13(*b*) and 13(*c*), there is also an advantage in that a plurality of work pieces can be imaged at a time by widening a visual field range.

Figure 14A:
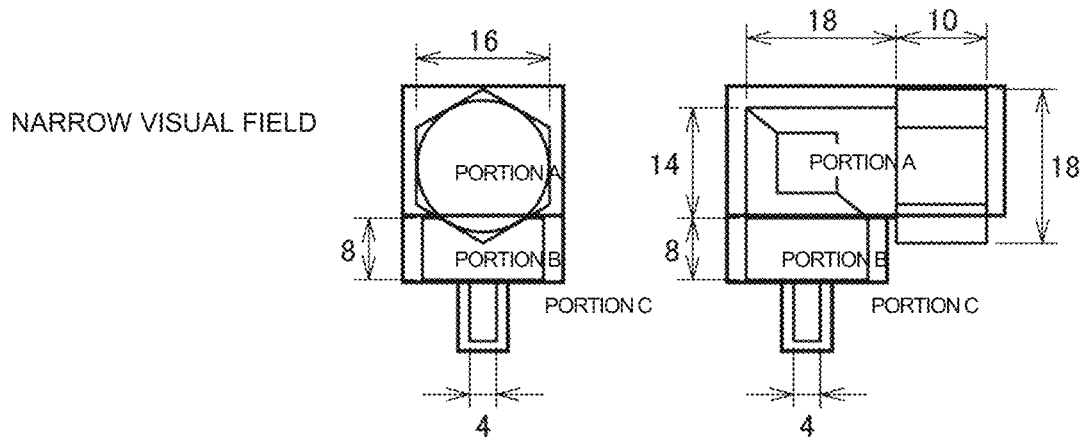
FIGS. 14(a)-14(c) are diagrams illustrating a registration example of partial models based on a visual field of the imaging unit in the measurement system according to the present embodiment.
Figure 14B:
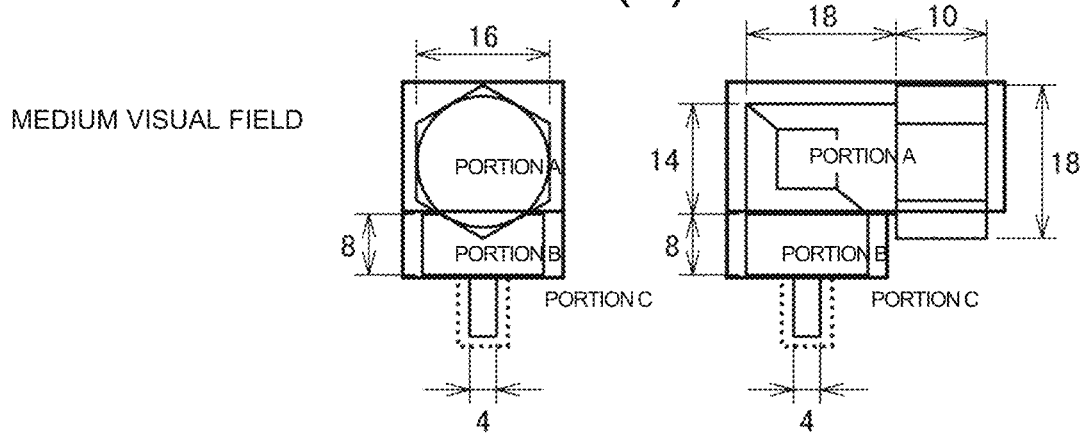
Figure 14C:
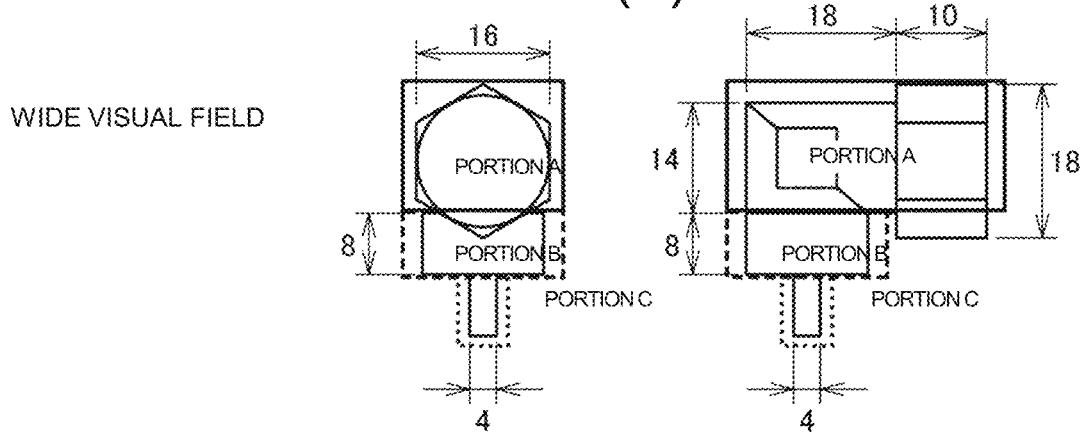

FIGS. 14(*a*)-14(*c*) are diagrams illustrating a registration example of partial models based on a visual field of the imaging unit 16 in the measurement system 2 according to the present embodiment. FIGS. 14(*a*)-12(*c*) illustrate an example in which an entire model of a work piece is specified using three partial models (a portion A, a portion B and a portion C).

FIG. 14(*a*) illustrates a registration example of partial models in a case that a narrow visual field type is adopted, FIG. 14(*b*) illustrates a registration example of partial models in a case that a medium visual field type is adopted, and FIG. 14(*c*) illustrates a registration example of partial models in a case that a wide visual field type is adopted.

A registration model illustrated in FIG. 14(*a*) is specified by three partial models and is assumed to be collated with a measurement result having the highest accuracy of measurement, and thus a relatively high weighting coefficient is set for each of the partial models.

Although a registration model illustrated in FIG. 14(*b*) is also specified by three partial models, a weighting coefficient which is set for each of the partial models has a relatively small value.

Since a registration model illustrated in FIG. 14(*c*) is assumed to be collated with a measurement result having the lowest accuracy of measurement, the portion C for which it is assumed that a sufficient accuracy of measurement is not obtained is excluded from a registration target.

In FIGS. 13(*a*)-13(*c*) and 14(*a*)-14(*c*), the accuracy of measurement based on the width of a visual field has been described, but the same operations can also be realized by making a resolution different. For example, it is possible to increase the accuracy of measurement similar to the above-described narrow visual field by increasing a resolution even in the same visual field, and conversely, the accuracy of measurement is lowered similar to the above-described wide visual field by reducing a resolution. Even in such a case that a resolution of the imaging unit is made different, the number of partial models to be included may be optimized.

In this manner, in the measurement system 2 according to the present embodiment, regarding an entire model for each work piece type, the number of partial models to be included may be made different depending on a visual field or a resolution of the imaging unit. Meanwhile, partial models based on both a visual field of the imaging unit 16 and the imaging unit 16 may be set. It is possible to realize more appropriate object recognition by setting partial models based on a visual field or a resolution of the imaging unit 16.

Further, in the measurement system 2 according to the present embodiment, a weighting coefficient (the degree of importance) which is given to each partial model may be set to a value varying depending on a visual field of the imaging unit 16. It is possible to realize more appropriate object recognition by setting a weighting coefficient based on a visual field of the imaging unit 16. Similarly, a weighting coefficient (the degree of importance) which is given to each partial model may be set to a value varying depending on a resolution of the imaging unit 16.

In this manner, in the present embodiment, the number of partial models to be registered and the magnitude of a weighting coefficient to be given may be determined in accordance with a visual field or a resolution of the imaging unit 16 of the measurement head 10. Meanwhile, a weighting coefficient based on both a visual field of the imaging unit 16 and the imaging unit 16 may be set. It is possible to realize more appropriate object recognition by setting a weighting coefficient based on both a visual field and a resolution of the imaging unit 16.

(f5: Example of User Interface Screen for Model Registration)

Next, an example of a user interface screen for registering an entire model and a partial model used in the measurement system 2 according to the present embodiment will be described.

Figure 15:
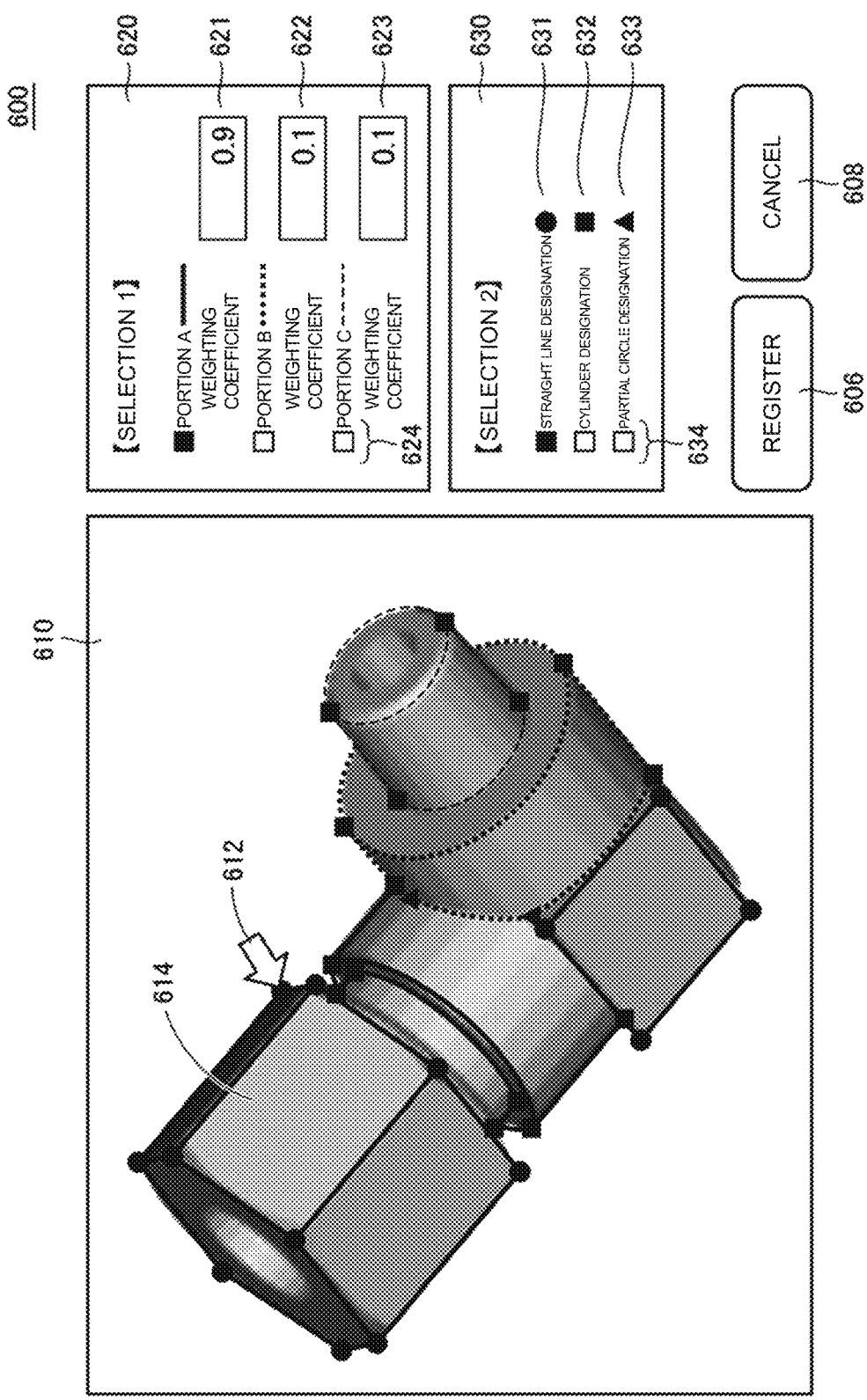
FIG. 15 is a schematic view illustrating an example of a user interface screen for performing model registration in the measurement system according to the present embodiment.

FIG. 15 is a schematic view illustrating an example of a user interface screen for performing model registration in the measurement system 2 according to the present embodiment. In a user interface screen 600 illustrated in FIG. 15, a method in which a user arbitrarily designates a point for specifying a shape while using a display mode of 3D CAD is adopted. That is, the user can easily designate and register a boundary of an element to be registered as a partial model by designating a point on a work piece displayed on 3D CAD using a mouse or the like.

More specifically, referring to FIG. 15, the user interface screen 600 includes a 3D CAD display region 610, a first selection item region 620, a second selection item region 630, a registration button 606 and a cancellation button 608.

The model registration function of the measurement system 2 provides the 3D CAD display region 610 as a function of displaying the shape of a work piece to be registered on a virtual space.

The first selection item region 620 is an element that receives the setting of a weighting coefficient for each partial model and includes setting regions 621 to 623 for weighting coefficients corresponding to a first partial region to a third partial region. In the example illustrated in FIG. 15, names of a portion A, a portion B and a portion C are given.

The second selection item region 630 is an element that receives the type of boundary for specifying the range of a partial model and includes straight line designation 631, cylinder designation 632 and partial circle designation 633.

As an example of a specific procedure of a partial model, first, a user selects a partial model to be registered by operating a check box 624 within the first selection item region 620 (in the example illustrated in FIG. 15, the portion A is selected). Subsequently, the user selects the type of figure for specifying the boundary of the selected partial model by operating a check box 634 within the second selection item region 630 (in the example illustrated in FIG. 15, a "straight line" is selected) and sequentially repeats disposition and selection (typically, a click operation) at a position to be set as a boundary using a cursor 612 within the 3D CAD display region 610, so that a boundary for specifying the partial model 614 is set.

In this manner, the model registration function of the measurement system 2 has a function of receiving the setting of the type of figure for defining a boundary for specifying a partial model.

The model registration function of the measurement system 2 has a function of receiving the setting of a boundary for specifying a partial model with respect to a work piece displayed on a virtual space.

Finally, the user selects the registration button 606, so that the set partial model 614 and a corresponding weighting coefficient are registered in association with each other. Meanwhile, the cancellation button 608 is selected, so that selected contents are temporarily cancelled.

The user repeats the above-described setting process by the number of partial models included in the entire model, so that the registration of the entire model and the partial models necessary for object authentication is completed.

Figure 16:
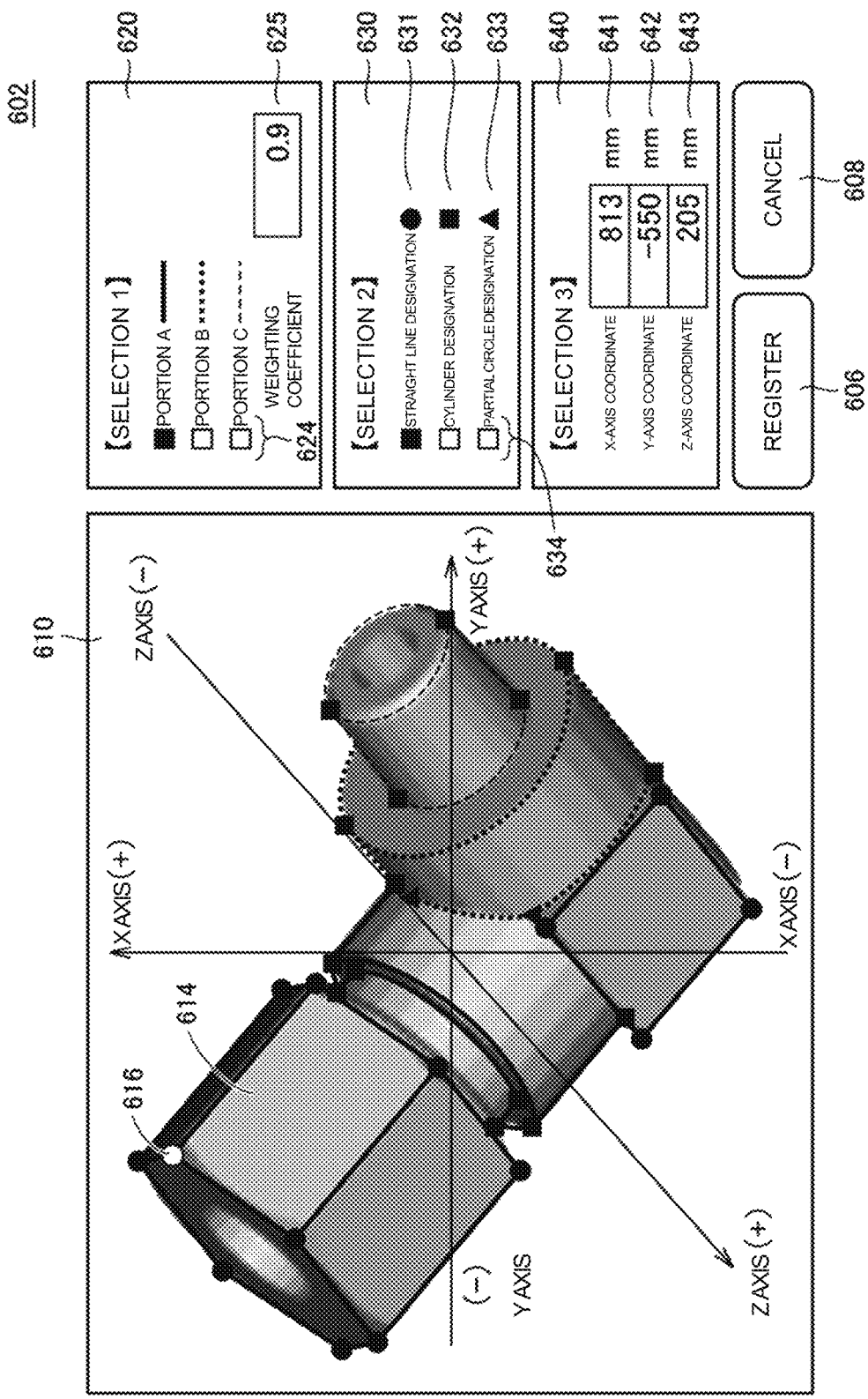
FIG. 16 is a schematic view illustrating another example of a user interface screen for performing model registration in the measurement system according to the present embodiment.

FIG. 16 is a schematic view illustrating another example of a user interface screen for performing model registration in the measurement system 2 according to the present embodiment. In a user interface screen 602 illustrated in FIG. 16, a method in which a user directly and arbitrarily designates coordinate values of a point for specifying a shape is adopted.

More specifically, referring to FIG. 16, the user interface screen 602 includes a 3D CAD display region 610, a first selection item region 620, a second selection item region 630, a third selection item region 640, a registration button 606, and a cancellation button 608.

The first selection item region 620 is an element that receives the setting of a partial model to be set and a corresponding weighting coefficient. In the example illustrated in FIG. 16, names of a portion A, a portion B and a portion C are given. The first selection item region 620 includes a setting region 625 for a weighting coefficient.

The second selection item region 630 is an element that receives the type of boundary for specifying the range of a partial model and includes straight line designation 631, cylinder designation 632 and partial circle designation 633.

The third selection item region 640 is an element that receives coordinate values of a point for specifying the range of a partial model and includes an X-axis coordinate 641, a Y-axis coordinate 642 and a Z-axis coordinate 643.

As an example of a specific procedure of a partial model, first, a user selects a partial model to be registered by operating a check box 624 within the first selection item region 620 (in the example illustrated in FIG. 16, the portion A is selected). In addition, the user inputs a weighting coefficient to be given to the selected partial model to the setting region 625.

Subsequently, the user selects the type of figure for specifying the boundary of the selected partial model by operating a check box 634 within the second selection item region 630 (in the example illustrated in FIG. 16, a "straight line" is selected). Further, the user inputs coordinate values for specifying the boundary of each partial model to the X-axis coordinate 641, the Y-axis coordinate 642 and the Z-axis coordinate 643 within the third selection item region 640. A position to be set as a boundary is sequentially input by repeating setting for the second selection item region 630 and the third selection item region 640, so that a boundary for specifying the partial model 614 is set.

Finally, the user selects the registration button 606, so that the set partial model 614 and a corresponding weighting coefficient are registered in association with each other. Meanwhile, the cancellation button 608 is selected, so that selected contents are temporarily cancelled.

The user repeats the above-described setting process by the number of partial models included in the entire model, so that the registration of the entire model and the partial models necessary for object authentication is completed.

It is possible to register a boundary of each partial model with a high level of accuracy by using the user interface screen 602 as illustrated in FIG. 16.

Figure 17:
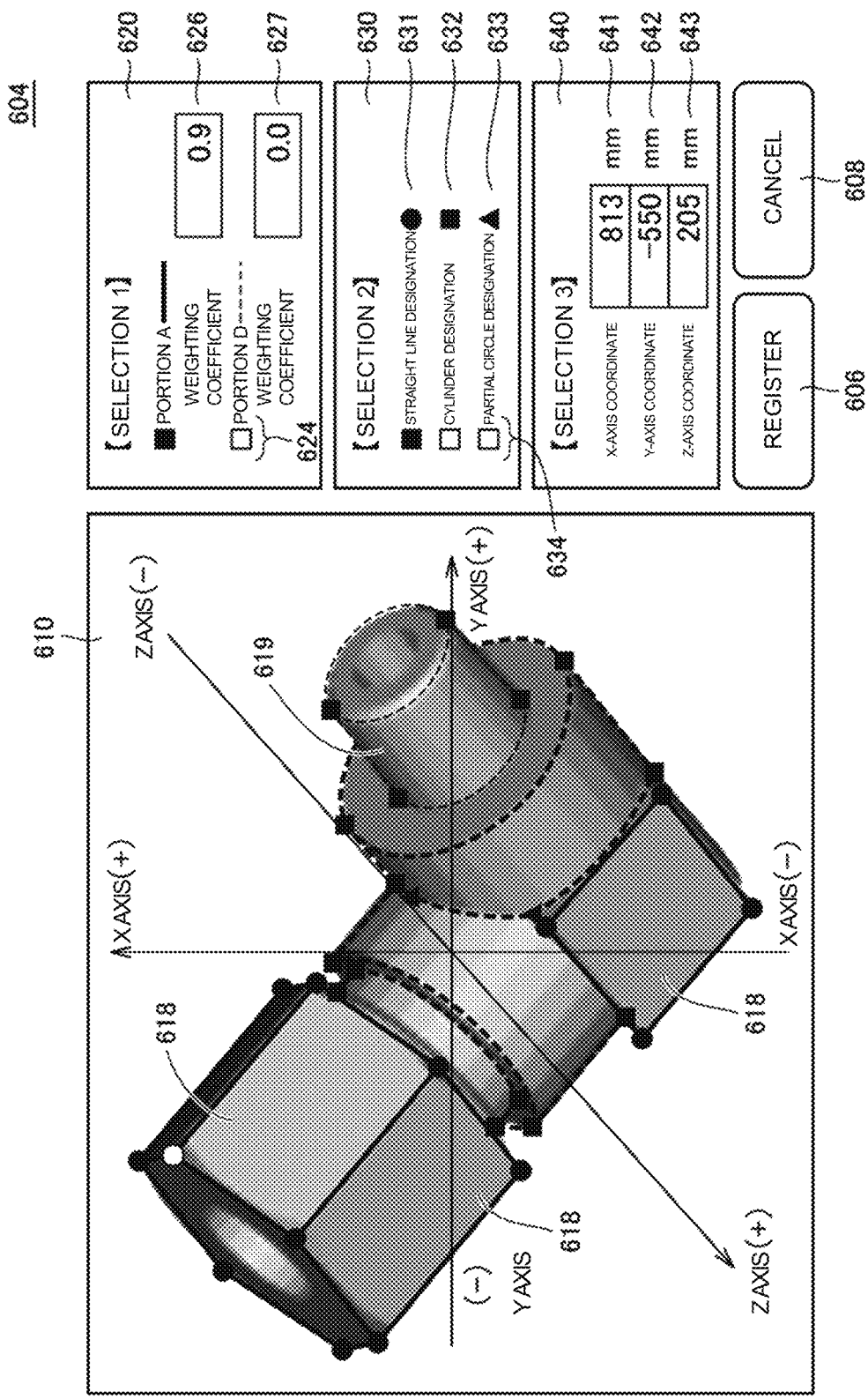
FIG. 17 is a schematic view illustrating still another example of a user interface screen for performing model registration in the measurement system according to the present embodiment.

FIG. 17 is a schematic view illustrating still another example of a user interface screen for performing model registration in the measurement system 2 according to the present embodiment. In a user interface screen 604 illustrated in FIG. 17, a method in which a user sets a partial model to be registered and a partial model not to be registered is adopted.

More specifically, referring to FIG. 17, the user interface screen 604 includes a 3D CAD display region 610, a first selection item region 620, a second selection item region 630, a third selection item region 640, a registration button 606 and a cancellation button 608.

The first selection item region 620 is an element that receives the setting of weighting coefficients corresponding to a partial model to be registered and a partial model not to be registered. In the example illustrated in FIG. 17, names of a portion A (a partial model to be registered) and a portion D (a partial model not to be registered) are given. The first selection item region 620 includes setting regions 626 and 627 for weighting coefficients.

The second selection item region 630 is an element that receives the type of boundary for specifying the range of a partial model and includes straight line designation 631, cylinder designation 632 and partial circle designation 633.

The third selection item region 640 is an element that receives coordinate values of a point for specifying the range of a partial model and includes an x-axis coordinate 641, a Y-axis coordinate 642 and a Z-axis coordinate 643.

As an example of a specific procedure of a partial model, first, a user selects a partial model to be registered or a partial model not to be registered by operating a check box 624 within the first selection item region 620 (in the example illustrated in FIG. 17, the portion A is selected). In addition, the user inputs a weighting coefficient to be given to the selected partial model to the setting region 626 or the setting region 627. Weighting coefficients for regions other than the portion A and the portion D are calculated from weighting coefficients to be respectively given to the portion A and the portion D (typically, an average value of both).

Subsequently, the user selects the type of figure for specifying the boundary of the selected partial model by operating a check box 634 within the second selection item region 630 (in the example illustrated in FIG. 17, a "straight line" is selected). Further, the user inputs coordinate values for specifying the boundary of each partial model to the X-axis coordinate 641, the Y-axis coordinate 642 and the Z-axis coordinate 643 within the third selection item region 640. A position to be set as a boundary is sequentially input by repeating setting for the second selection item region 630 and the third selection item region 640, so that a boundary for specifying a partial model 618 (partial model to be registered) or a partial model 619 (partial model not to be registered) is set.

In the user interface screen 604 illustrated in FIG. 17, the setting of a boundary for specifying a partial model to be included in an entire model and a boundary for specifying a partial model not to be included in an entire model is received.

Finally, the user selects the registration button 606, so that the set partial model 618 and partial model 619 and corresponding weighting coefficients are registered in association with each other. Meanwhile, the cancellation button 608 is selected, so that selected contents are temporarily cancelled. In this case, regarding portions other than the portion A and the portion D, a region may be specified automatically and registered together with a previously calculated weighting coefficient.

The user designates the surface of a work piece on 3D CAD by using the user interface screen 604 as illustrated in FIG. 17, so that it is possible to easily register, for example, only portions necessary for adsorption and holding.

G. Determination of Degree of Consistency

Next, some examples of determination of the degree of consistency which is applied to a measured three-dimensional shape will be described. This determination of the degree of consistency is equivalent to the processes of steps S206 and S208 of FIG. 7.

In the present embodiment, it is determined whether consistency with any one entire model is made based on weighting coefficients (the degree of importance) corresponding to one or more partial models included in the entire model.

As a determination method based on such a degree of importance, the recognition processing unit 56 may determine that consistency with any one entire model is made when each of degrees of consistency between some or all of partial models included in the entire model and a measured three-dimensional shape satisfies each of determination criteria determined based on the degrees of importance corresponding to the respective partial models.

For example, in a case that any entire model is defined as being constituted by the above-described three partial models (the portion A, the portion B and the portion C), it is assumed that degrees of consistency $M_A$, $M_B$ and $M_C$ between each of the portion A, the portion B and the portion C and the measured three-dimensional shape are obtained. In addition, it is assumed that threshold values $TH_A$, $M_B$ and $M_C$ are determined based on weighting coefficients (the degrees of importance) associated with the portion A, the portion B and the portion C. Here, it may be determined whether or not consistency with a target entire model is made by applying a determination criterion that all or some of the degree of consistency $M_A$>the threshold value $TH_A$, the degree of consistency $M_B$>a threshold value $TH_B$, the degree of consistency $M_C$>a threshold value $TH_C$ are established.

In this manner, a criterion for determining whether or not the degree of consistency between each partial model and the measured three-dimensional shape exceeds a threshold value calculated based on the weighting coefficients (the degrees of importance) given to the respective partial model may be adopted, or a criterion for determining whether or not some partial models exceed a corresponding threshold value may be adopted.

As another determination method based on the degree of importance, the recognition processing unit 56 may determine that the measured three-dimensional shape is consistent with any one entire model when the degree of consistency for the entire model which is calculated based on each of the degrees of consistency between the measured three-dimensional shape and some or all of partial models included in the entire model and each of the degrees of importance corresponding to the respective partial models satisfies a determination criterion determined in advance.

For example, in a case that any entire model is defined as being constituted by the above-described three partial models (the portion A, the portion B and the portion C), it is assumed that degrees of consistency $M_A$, $M_B$ and $M_C$ between each of the portion A, the portion B and the portion C and the measured three-dimensional shape are obtained. Here, a degree of consistency M between the entire model and the measured three-dimensional shape can be calculated in accordance with the degree of consistency M=a degree of consistency $M_A$×a weighting coefficient $W_A$+a degree of consistency $M_B$×a weighting coefficient $W_B$+a degree of consistency $M_C$×a weighting coefficient $W_C$. In addition, it may be determined whether or not consistency with a target entire model is made by applying a criterion for determining whether or not the degree of consistency M calculated in this manner exceeds a threshold value TH determined in advance.

In this manner, a weighted average obtained by multiplying a degree of consistency between each partial model and the measured three-dimensional shape by a corresponding weighting coefficient is calculated, and a criterion for determining whether or not the calculated weighted average exceeds a threshold value determined in advance may be adopted.

Meanwhile, the application of a determination criterion can be implemented using a determination sequence using a tree structure or a logical determination method, and any other implementation form can be adopted.

H. Appendix

The present embodiment described above includes the following technical ideas.

[Configuration 1]

A measurement system, comprising:

a shape measurement unit (50; 10, 100) which optically measures a three-dimensional shape of a work piece (W) disposed at a predetermined position;

a storage unit (60; 106) which previously stores a three-dimensional shape indicating an entire model (62) for each work piece type; and a recognition processing unit (56; 102) which executes at least one of a detection of presence of a work piece and a specification of a work piece type based on whether or not the three-dimensional shape measured by the shape measurement unit is consistent with any one entire model stored in the storage unit, wherein the entire model (62) for each work piece type is specified by a combination of a plurality of partial models (64) and each of the plurality of partial models (64) is correspondingly given a degree of importance (66), and the recognition processing unit determines whether or not the three-dimensional shape is consistent with any one entire model based on the degrees of importance corresponding to one or more partial models included in the entire model (70).

[Configuration 2]

The measurement system according to configuration 1, wherein the shape measurement unit includes an imaging unit (52; 14) that images the work piece disposed at the predetermined position, and the entire model for each work piece type is configured such that the number of partial models included therein varies depending on a visual field or a resolution of the imaging unit.

[Configuration 3]

The measurement system according to configuration 2, wherein the degree of importance given to each partial model is set to the value varying depending on a visual field or the resolution of the imaging unit.

[Configuration 4]

The measurement system according to any one of configurations 1 to 3, wherein the degree of importance is obtained by reflecting the number of measurement points on a surface of the work piece measured by the shape measurement unit.

[Configuration 5]

The measurement system according to any one of configurations 1 to 4, wherein the recognition processing unit determines that the three-dimensional shape is consistent with any one entire model when each of degrees of consistency between the measured three-dimensional shape and some or all of partial models included in the entire model satisfies each of determination criteria determined based on the degrees of importance corresponding to the respective partial models.

[Configuration 6]

The measurement system according to any one of configurations 1 to 4, wherein the recognition processing unit determines that the three-dimensional shape is consistent with any one entire model when a degree of consistency for the entire model, which is calculated based on each of degrees of consistency between the measured three-dimensional shape and some or all of partial models included in the entire model and each of the degrees of importance corresponding to the respective partial models, satisfies a determination criterion determined in advance.

[Configuration 7]

The measurement system according to any one of configurations 1 to 6, further including:

a model registration unit (102; 600, 602, 604) which receives design data of the work piece and divides a three-dimensional shape specified by the received design data into a plurality of partial shapes in accordance with a user's operation.

[Configuration 8]

The measurement system according to configuration 7, wherein the model registration unit gives a degree of importance to each of the separate partial shapes in accordance with the user's operation (600, 602, 604).

[Configuration 9]

The measurement system according to any one of configurations 1 to 8, wherein the model registration unit includes a display part (610) that displays a shape of the work piece to be registered on a virtual space and a receiving part (612;640) that receives setting of a boundary for specifying a partial model with respect to the work piece displayed on the virtual space.

[Configuration 10]

The measurement system according to configuration 9, wherein the model registration unit further includes a receiving part (630) that receives a setting of a type of figure for defining the boundary for specifying the partial model.

[Configuration 11]

The measurement system according to configuration 9 or 10, wherein the model registration unit receives a setting of a boundary for specifying a partial model to be included in the entire model and a boundary for specifying a partial model not to be included in the entire model (604).

[Configuration 12]

A measurement method including:

a step (S200, S202) of optically measuring a three-dimensional shape of a work piece disposed at a predetermined position; and a step (S206, S208) of executing at least one of a detection of presence of a work piece and a specification of a work piece type based on whether or not the measured three-dimensional shape is consistent with any one entire model stored in advance, wherein a three-dimensional shape indicating an entire model (62) is stored in advance for each work piece type, the entire model (62) for each work piece type is specified by a combination of a plurality of partial models (64), and each of the plurality of partial models (64) is correspondingly given a degree of importance (66), and the step of executing at least one of the detection and the specification includes a step (S208) of determining whether or not the three-dimensional shape is consistent with any one entire model based on degrees of importance corresponding to one or more partial models included in the entire model.

I. Advantage

For example, in a picking system that measures a three-dimensional shape to hold a work piece, the presence of the work piece cannot be recognized in spite of the work piece being present, and thus the picking system may not be able to continuously operate. As a reason for the occurrence of such a situation, a loss of a point group due to mutual hiding of work pieces, a loss of a point group due to optical conditions (reflection, gloss, low contrast), an insufficient measurement resolution due to a fine shape, and the like are assumed.

With respect to such a problem, there is a method of attempting to improve imaging conditions by adjusting an imaging time and an imaging method, or the like. Although imaging may be possible in some cases, there is a problem that a processing time is extended. In addition, there is also a method of changing work conditions by an external device such as mixing of work pieces or application of vibration to a container. There is a problem in that a processing time is extended even when such a method is adopted.

With respect to such a problem, in the measurement system 2 according to the present embodiment, the accuracy of recognition is improved by constituting an entire model of a work piece using one or a plurality of partial models each of which is given a degree of priority. That is, it is possible to reduce a possibility that erroneous recognition as a different work piece may occur and a possibility that it may be recognized that no work piece is present in spite of the work piece being present.

J. Other Configurations

According to an embodiment of the present technology, a measurement system is provided to include a shape measurement unit which optically measures a three-dimensional shape of a work piece disposed at a predetermined position, a storage unit which previously stores a three-dimensional shape indicating an entire model for each work piece type, and a recognition processing unit which executes at least one of a detection of presence of a work piece and a specification of a work piece type based on whether or not the three-dimensional shape measured by the shape measurement unit is consistent with any one entire model stored in the storage unit. The entire model for each work piece type is specified by a combination of a plurality of partial models and each of the plurality of partial models is correspondingly given a degree of importance. The recognition processing unit determines whether or not the three-dimensional shape is consistent with any one entire model based on degrees of importance corresponding to one or more partial models included in the entire model.

According to this disclosure, since the entire model is specified using one or a plurality of partial models each of which is given a degree of importance, it is possible to suppress erroneous detection that may occur in a case that a partial model not given a degree of importance is used and to suppress non-detection that may occur in a case that only an entire model is used.

In the above-described disclosure, the shape measurement unit may include an imaging unit that images the work piece disposed at the predetermined position, and the entire model for each work piece type may be configured such that the number of partial models included therein varies depending on a visual field or a resolution of the imaging unit.

According to this disclosure, since the entire model constituted by partial models based on a measurement density (resolution) varying depending on the size of the visual field of the imaging unit can be adopted, it is possible to increase the accuracy of object authentication.

In the above-described disclosure, the degree of importance given to each partial model may be set to a value varying depending on the visual field or the resolution of the imaging unit.

According to this disclosure, since the degree of importance given to each partial model based on a measurement density (resolution) varying depending on the size of the visual field of the imaging unit can be optimized, it is possible to increase the accuracy of object authentication.

In the above-described disclosure, the degree of importance may be obtained by reflecting the number of measurement points on a surface of the work piece measured by the shape measurement unit.

According to this disclosure, it is possible to adopt a determination criterion suitable for a configuration in which a three-dimensional shape is measured by projecting a shading pattern onto the work piece.

In the above-described disclosure, the recognition processing unit may determine that the three-dimensional shape is consistent with any one entire model when each of degrees of consistency between the measured three-dimensional shape and some or all of partial models included in the entire model satisfies each of determination criteria determined based on the degrees of importance corresponding to the respective partial models.

According to this disclosure, the recognition processing unit can accurately determine whether or not consistency with an entire model is made by evaluating the degree of consistency for each partial model based on the corresponding degree of importance.

In the above-described disclosure, the recognition processing unit may determine that the three-dimensional shape is consistent with any one entire model when a degree of consistency for the entire model, which is calculated based on each of degrees of consistency between the measured three-dimensional shape and some or all of partial models included in the entire model and each of the degrees of importance corresponding to the respective partial models, satisfies a determination criterion determined in advance.

According to this disclosure, the recognition processing unit can accurately determine whether or not consistency with an entire model is made by calculating the degree of consistency for the entire model based on the degree of consistency for each partial model.

In the above-described disclosure, the measurement system may further include a model registration unit which receives design data of the work piece and divides a three-dimensional shape specified by the received design data into a plurality of partial shapes in accordance with a user's operation.

According to this disclosure, since one or a plurality of partial models can be registered based on the design data, it is possible to realize an improvement in accuracy and a reduction in a time required for a registration operation as compared to a case that a partial model is actually registered through imaging or the like.

In the above-described disclosure, the model registration unit may give a degree of importance to each of the separate partial shapes in accordance with the user's operation.

According to this disclosure, the user can set an appropriate degree of importance in accordance with the use of each portion of the work piece, or the like.

In the above-described disclosure, the model registration unit may include a display part that displays a shape of the work piece to be registered on a virtual space; and a receiving part that receives a setting of a boundary for specifying a partial model with respect to the work piece displayed on the virtual space.

According to this disclosure, since the user can arbitrarily set a range to be registered as a partial model while viewing the work piece to be displayed on the virtual space, it is possible to reduce a time required for a registration operation for the partial model.

In the above-described disclosure, the model registration unit may further include a receiving part that receives a setting of a type of figure for defining the boundary for specifying the partial model.

According to this disclosure, since the user can first specify the type of figure and then set a boundary to be input at the time of specifying a partial model, it is possible to reduce a time required for a registration operation for the partial model.

In the above-described disclosure, the model registration unit may receive a setting of a boundary for specifying a partial model to be included in the entire model and a boundary for specifying a partial model not to be included in the entire model.

According to this disclosure, since information required to specify the entire model can be registered when the user sets a partial model to be included in the entire model and a partial model not to be included in the entire model, it is possible to reduce a time required for a registration operation for the partial model.

According to another embodiment of the present technology, a measurement method is provided to include a step of optically measuring a three-dimensional shape of a work piece disposed at a predetermined position, and a step of executing at least one of a detection of presence of a work piece and a specification of a work piece type based on whether or not the measured three-dimensional shape is consistent with any one entire model stored in advance. A three-dimensional shape indicating an entire model is stored in advance for each work piece type, the entire model for each work piece type is specified by a combination of a plurality of partial models, and each of the plurality of partial models is correspondingly given a degree of importance. The step of executing at least one of the detection and the specification includes a step of determining whether or not the three-dimensional shape is consistent with any one entire model based on the degrees of importance corresponding to one or more partial models included in the entire model.

According to this disclosure, since an entire model is specified using one or a plurality of partial models each of which is given a degree of importance, it is possible to suppress erroneous detection that may occur in a case that a partial model not given a degree of importance is used and to suppress non-detection that may occur in a case that only an entire model is used.

According to the present technology, it is possible to realize object authentication with higher accuracy than in the related art.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A measurement system, comprising:
a shape measurement unit which includes a light projection unit and an imaging unit, and optically measures a three-dimensional shape of a work piece disposed at a predetermined position, wherein the light projection unit emits measurement light and the imaging unit images the work piece disposed at the predetermined position in a state where measurement light is projected;
a memory which previously stores a three-dimensional shape indicating an entire model for each work piece type; and
a processor which executes at least one of a detection of presence of a work piece and a specification of a work piece type based on whether or not the three-dimensional shape measured by the processor is consistent with any one entire model stored in the memory,
wherein the entire model for each work piece type is specified by a combination of a plurality of partial models and each of the plurality of partial models is correspondently given a degree of importance, and
the processor determines whether or not the three-dimensional shape is consistent with any one entire model based on the degrees of importance corresponding to one or more partial models included in the entire model,
wherein the entire model for each work piece type is configured such that the number of partial models included therein varies depending on a visual field and a resolution of the imaging unit,
wherein each of the partial models represents a portion of the workpiece which is captured by the imaging unit from a specific angle.

2. The measurement system according to claim 1, wherein the degree of importance given to each partial model is set to a value varying depending on the visual field or the resolution of the imaging unit.

3. The measurement system according to claim 1, wherein the degree of importance is obtained by reflecting the number of measurement points on a surface of the work piece measured by the shape measurement unit.

4. The measurement system according to claim 1, wherein the processor determines that the three-dimensional shape is consistent with any one entire model when each of degrees of consistency between the measured three-dimensional shape and some or all of partial models included in the entire model satisfies each of determination criteria determined based on the degrees of importance corresponding to the respective partial models.

5. The measurement system according to claim 1, wherein the processor determines that the three-dimensional shape is consistent with any one entire model when a degree of consistency for the entire model, which is calculated based on each of degrees of consistency between the measured three-dimensional shape and some or all of partial models included in the entire model and each of the degrees of importance corresponding to the respective partial models, satisfies a determination criterion determined in advance.

6. The measurement system according to claim 1, wherein the processor performs a model registration process that receives design data of the work piece and divides a three-dimensional shape specified by the received design data into a plurality of partial shapes in accordance with a user's operation.

7. The measurement system according to claim 6, wherein the processor gives a degree of importance to each of the separate partial shapes in accordance with the user's operation.

8. The measurement system according to claim 7, wherein the model registration process is performed through a user interface screen that includes:
- a display part that displays a shape of the work piece to be registered on a virtual space; and
- a receiving part that receives a setting of a boundary for specifying a partial model with respect to the work piece displayed on the virtual space.

9. The measurement system according to claim 8, wherein the user interface screen further includes a receiving part that receives a setting of a type of figure for defining the boundary for specifying the partial model.

10. The measurement system according to claim 6, wherein the model registration process is performed through a user interface screen that includes:
- a display part that displays a shape of the work piece to be registered on a virtual space; and
- a receiving part that receives a setting of a boundary for specifying a partial model with respect to the work piece displayed on the virtual space.

11. The measurement system according to claim 10, wherein the user interface screen further includes a receiving part that receives a setting of a type of figure for defining the boundary for specifying the partial model.

12. The measurement system according to claim 11, wherein the model registration process is performed to receive a setting of a boundary for specifying a partial model to be included in the entire model and a boundary for specifying a partial model not to be included in the entire model.

13. The measurement system according to claim 10, wherein the model registration process is performed to receive a setting of a boundary for specifying a partial model to be included in the entire model and a boundary for specifying a partial model not to be included in the entire model.

14. A measurement method comprising:
- a step of optically measuring a three-dimensional shape of a work piece disposed at a predetermined position; and
- a step of executing at least one of a detection of presence of a work piece and a specification of a work piece type based on whether or not the measured three-dimensional shape is consistent with any one entire model stored in advance,
- wherein a three-dimensional shape indicating an entire model is stored in advance for each work piece type, the entire model for each work piece type is specified by a combination of a plurality of partial models, and each of the plurality of partial models is correspondently given a degree of importance, and
- the step of executing at least one of the detection and the specification includes a step of determining whether or not the three-dimensional shape is consistent with any one entire model based on the degrees of importance corresponding to one or more partial models included in the entire model,
- wherein the entire model for each work piece type is configured such that the number of partial models included therein varies depending on a visual field and a resolution of the imaging unit,
- wherein each of the partial models represents a portion of the workpiece which is captured by the imaging unit from a specific angle.

* * * * *